United States Patent
Zhao

(10) Patent No.: US 6,563,641 B2
(45) Date of Patent: May 13, 2003

(54) FOLD INTERLEAVER

(75) Inventor: Bin Zhao, Irvine, CA (US)

(73) Assignee: Cirvine Corporation, Irvine, CA (US)

(*) Notice: Subject to any disclaimer, the term of this patent is extended or adjusted under 35 U.S.C. 154(b) by 19 days.

(21) Appl. No.: 09/892,224

(22) Filed: Jun. 25, 2001

(65) Prior Publication Data

US 2001/0055154 A1 Dec. 27, 2001

Related U.S. Application Data

(60) Provisional application No. 60/213,370, filed on Jun. 23, 2000.

(51) Int. Cl.[7] .................................. G02B 5/30
(52) U.S. Cl. ................... 359/495; 359/497; 359/498; 359/487; 359/900
(58) Field of Search .................. 359/484, 487, 359/495, 497, 498, 900

(56) References Cited

U.S. PATENT DOCUMENTS

| | | | |
|---|---|---|---|
| 4,247,166 A | 1/1981 | Yeh | 350/374 |
| 4,500,178 A | 2/1985 | Yeh | 350/404 |
| 4,548,479 A | 10/1985 | Yeh | 350/404 |
| 5,062,694 A | 11/1991 | Blair | 359/498 |
| 5,471,340 A * | 11/1995 | Cheng et al. | |
| 5,574,596 A | 11/1996 | Cheng | 359/484 |
| 5,606,439 A | 2/1997 | Wu | 349/117 |
| 5,682,446 A | 10/1997 | Pan et al. | 385/11 |
| 5,694,233 A | 12/1997 | Wu et al. | 359/117 |
| 5,724,165 A * | 3/1998 | Wu | |
| 5,768,005 A * | 6/1998 | Cheng et al. | 359/484 |
| 5,818,981 A | 10/1998 | Pan et al. | 385/11 |
| 5,867,291 A | 2/1999 | Wu et al. | 359/124 |
| 5,930,418 A * | 7/1999 | Chang | |
| 5,930,422 A * | 7/1999 | Cheng | 359/495 |
| 5,978,116 A | 11/1999 | Wu et al. | 359/124 |
| 6,005,697 A | 12/1999 | Wu et al. | 359/117 |
| 6,014,244 A * | 1/2000 | Chang | |
| 6,049,427 A * | 4/2000 | Bettman | 359/497 |
| 6,075,647 A * | 6/2000 | Braun et al. | 359/484 |
| 6,097,869 A * | 8/2000 | Chang et al. | |
| 6,154,581 A * | 11/2000 | Lu et al. | 359/484 |
| 6,212,313 B1 * | 4/2001 | Li | |
| 6,301,046 B1 * | 10/2001 | Tai et al. | 359/495 |

OTHER PUBLICATIONS

Pages 10–29 from book believed to be entitled *Electromagnetic Theory*. No further information on book is available.
Carl F. Buhrer; *Synthesis and tuning of high–order Solc–type birefringent filters*, Applied Optics, Apr. 20, 1994, vol. 33, No. 12, pp. 2249–2254.
Tatsuya Kimura, Masatoshi Saruwatari; *Temperature Compensation of Birefringent Optical Filters*; Proceeding Letters, Aug. 1971, pp. 1273–1274.
Carl F. Buhrer; *Four waveplate dual tuner for birefringent filters and multiplexers*; Applied Optics, Sep. 1, 1987, vol. 26, No. 17, pp. 3628–3632.
P. Melman, W.J. Carlsen, B. Foley; *Tunable Birefringent Wavelength–Division Multiplexer/Demultiplexer*, Electronics Letters, Jul. 18, 1985, vol. 21, No. 15, pp. 634 and 635.
Yohji Fujii; *Tunable wavelength multi/demultiplexer using a variable retardation phase plate*; Applied Optics, Aug. 20, 1990, vol. 29, No. 29.
S.E. Harris, E.O. Ammann, I. C. Chang; *Optical Network Synthesis Using Birefringent Crystals.*I. Synthesis of Lossless Networks of Equal–Length Crystals*, Journal of the Optical Society of America, Oct. 1964, vol. 564, No. 10, pp. 1267–1279.
Tatsuya Kimura, Masatoshi Saruwatari, and Kenju Otsuka; *Birefringent Branching Filters for Wideband Opitical FDM Communications*; Applied Optics, Feb. 1973, vol. 12, No. 2, pp. 373 to 379.
Godfrey R. Hill; *Wavelength Domain Optical Network Techniques*; Proceedings of the IEEE, Jan. 1989, vol. 77, No. 1, pp. 121 to 132.
J. M. Senior, S.D. Cusworth; *Devices for Wavelength Multiplexing and Demultiplexing*; IEE Proceedings, Jun. 1989, vol. 136, Pt. J. No. 3, pp. 183–202.

* cited by examiner

Primary Examiner—Ricky D. Shafer
(74) Attorney, Agent, or Firm—Norman E. Carte; John W. Eldrege

(57) ABSTRACT

An interleaver has a birefringent element assembly and a reflector configured so as to direct light from the birefringent element assembly back into and through birefringent element assembly. The birefringent element assembly has at least one birefringent element. Directing light from the birefringent element assembly back through the birefringent element assembly enhances transmission characteristics and/or mitigates dispersion.

17 Claims, 16 Drawing Sheets

FOLD INTERLEAVER

PRIORITY CLAIM

This patent application claims the benefit of the filing date of United States Provisional Patent Application Ser. No. 60/213,370, filed on June 23, 2000 and entitled FOLD INTERLEAVE, the entire contents of which are hereby expressly incorporated by reference.

CROSS-REFERENCE TO RELATED APPLICATIONS

This patent application is related to co-pending application Ser. No. 09/891,795, filed Jun. 25, 2001 entitled APPARATUS FOR CHANNEL INTERLEAVING IN COMMUNICATIONS and co-pending application Ser. No. 09/891, 794, file Jun. 25, 2001 entitled TANDEM COMB FILTER; all filed on the instant date herewith and commonly owned by the Assignee of this patent application, the entire contents of all which are hereby expressly incorporated by reference.

FIELD OF THE INVENTION

The present invention relates generally to optical devices and relates more particularly to an interleaver for optical communications and the like.

BACKGROUND OF THE INVENTION

Optical communication systems which utilize wavelength-division multiplexing (WDM) and dense wavelength-division multiplexing (DWDM) technologies are well known. According to both wavelength-division multiplexing and dense wavelength-division multiplexing, a plurality of different wavelengths of light, preferably infrared light, are transmitted via a single medium such as an optical fiber. Each wavelength corresponds to a separate channel and carries information generally independently with respect to the other channels. The plurality of wavelengths (and consequently the corresponding plurality of channels) are transmitted simultaneously without interference with one another, so as to substantially enhance the transmission bandwidth of the communication system. Thus, according to wavelength-division multiplexing and dense wavelength-division multiplexing technologies, a much greater amount of information can be transmitted than is possible utilizing a single wavelength optical communication system.

The individual channels of a wavelength-division multiplexed or dense wavelength-division multiplexed signal must be selected or separated from one another at a receiver in order to facilitate detection and demodulation thereof. This separation or demultiplexing process can be performed or assisted by an interleaver. A similar device facilitates multiplexing of the individual channels by a transmitter.

It is important that the interleaver separate the individual channels sufficiently so as to mitigate undesirable crosstalk therebetween. Crosstalk occurs when channels overlap, i.e., remain substantially unseparated, such that some portion of one or more non-selected channels remains in combination with a selected channel. As those skilled in the art will appreciate, such crosstalk interferes with the detection and/or demodulation process. Generally, the effects of crosstalk must be compensated for by undesirably increasing channel spacing and/or reducing the communication speed, so as to facilitate reliable detection/demodulation of the signal.

However, as channel usage inherently increases over time, the need for efficient utilization of available bandwidth becomes more important. Therefore, it is highly undesirable to increase channel spacing and/or to reduce communication speed in order to compensate for the effects of crosstalk. Moreover, it is generally desirable to decrease channel spacing and to increase communication speed so as to facilitate the communication of a greater quantity of information utilizing a given bandwidth.

Modern dense wavelength-division multiplexed (DWDM) optical communications and the like require that network systems offer an ever-increasing number of channel counts, thus mandating the use of a narrower channel spacing in order to accommodate the increasing number of channel counts. The optical interleaver, which multiplexes and demultiplexes optical channels with respect to the physical media, i.e., optical fiber, offers a potential upgrade path, so as to facilitate scalability in both channel spacing and number of channel counts in a manner which enhances the performance of optical communication networks.

As a multiplexer, an interleaver can combine two streams of optical signals, wherein one stream contains odd channels and the other stream contains even channels, into a single, more densely spaced optical signal stream. As a demultiplexer, an interleaver can separate a dense signal stream into two, wider spaced streams, wherein one stream contains the odd channels and the other stream contains the even channels. Thus, the interleaver offers scalability which allows contemporary communication technologies that perform well at wider channel spacing to address narrower, more bandwidth efficient, channel spacings.

There are four basic types of interleavers suitable for multiplexing and demultiplexing optical signals. These include birefringent filters, thin-film dielectric devices, planar waveguides, and fiber-based devices. All of these contemporary interleaving technologies suffer from substantial limitations with respect to channel spacing, dispersion, insertion loss, channel isolation, temperature stability, cost, reliability and flexibility. For example, most commercially available interleavers provide only 100 GHz and 50 GHz channel spacings. Reduction of channel spacing to 25 GHz, 12.5 GHz and beyond appears to be difficult and challenging.

Since it is generally impractical and undesirably expensive to provide precise control during manufacturing, the actual wavelength of communication channels and the center wavelength of filters generally tend to mismatch with each other. Precise control of manufacturing processes is difficult because it involves the use of more stringent tolerances which inherently require more accurate manufacturing equipment and more time consuming procedures. The actual wavelength of the communication channel and the center wavelength of the filter also tend to drift over time due to inevitable material and device degradation over time and also due to changes in the optical characteristics of optical components due to temperature changes. Therefore, it is important that the passband be wide enough so as to include a selected signal, even when both the carrier wavelength of the selected signal and the center wavelength of the passband are not precisely matched or aligned during manufacturing and have drifted substantially over time.

Although having a wider filter passband is generally desirable, so as to facilitate the filtering of signals which have drifted somewhat from their nominal center wavelength, the use of such wider pass bands and the consequent accommodation of channel center wavelength drift does introduce the possibility for undesirably large dispersion being introduced into a filtered channel.

Typically, the dispersion introduced by a birefringent filter or interleaver increases rapidly as the channel spacing is reduced and as a channel moves away from its nominal center wavelength, as discussed in detail below. Thus, as more channel wavelength error is tolerated in a birefringent filter or interleaver, greater dispersion valves are likely to be introduced.

As those skilled in the art will appreciate, dispersion is the non-linear phase response of an optical device or system wherein light of different wavelengths is spread or dispersed, such that the phase relationship among the different wavelengths varies undesirably as the light passes through the device or system. Such dispersion undesirably distorts optical signals, such as those used in optical communication systems.

The nonlinear phase response or dispersion of WDM and DWDM devices is responsible for signal distortion which results in undesired limitations on channel capability. That is, such dispersion undesirably limits the useable bandwidth of a channel, such as that of a fiber optic communication system. Such undesirable limitation of the bandwidth of a channel in a fiber optic communication system inherently reduces the bit rate of data transmitted thereby.

Contemporary interleavers have dispersion versus wavelength curves which have zero dispersion value at a particular wavelength, such as at nominal channel center wavelength. The dispersion versus wavelength curve of such contemporary interleavers departs drastically from this zero dispersion value as the wavelength moves away from the nominal channel center wavelength. Thus, small deviations in channel center wavelength can result in undesirably large dispersion values being realized.

Since, as discussed in detail above, it is extremely difficult, if not impossible, to maintain the actual channel wavelength precisely at its nominal value, such channel center wavelengths do vary, thereby resulting in undesirably large dispersion values.

Although most examples discussed above utilize equivalent birefringent filter element orientations angels of 45°, −21° and 7° and utilize phase delays of Γ, 2Γ and 2Γ, those skilled in the art will appreciate that various other angles and phase delays are likewise suitable. For example, phase delays of Γ, 2Γ and Γ may alternatively be utilized.

Thus, there is a need to provide an optical interleaver which can overcome or mitigate at least some of the above-mentioned limitations.

SUMMARY OF THE INVENTION

The present inventions specifically addresses and alleviates the above-mentioned deficiencies associated with the prior art. More particularly, the present invention comprises an interleaver comprising a birefringent element assembly which comprises at least one birefringent element. The interleaver further comprises a reflector configured so as to direct light from the birefringent element assembly back into and through the birefringent element assembly, such that the light traverses the birefringent element assembly in two different and opposite directions. Directing light from the birefringent element assembly back through the birefringent element assembly such that the light traverses the birefringent element assembly in both directions substantially mitigates crosstalk and dispersion of the interleaver.

These, as well as other advantages of the present invention, will be more apparent from the following description and drawings. It is understood that changes in the specific structure shown and described may be made within the scope of the claims without departing from the spirit of the invention.

DETAILED DESCRIPTION OF THE INVENTION

Figure 1:
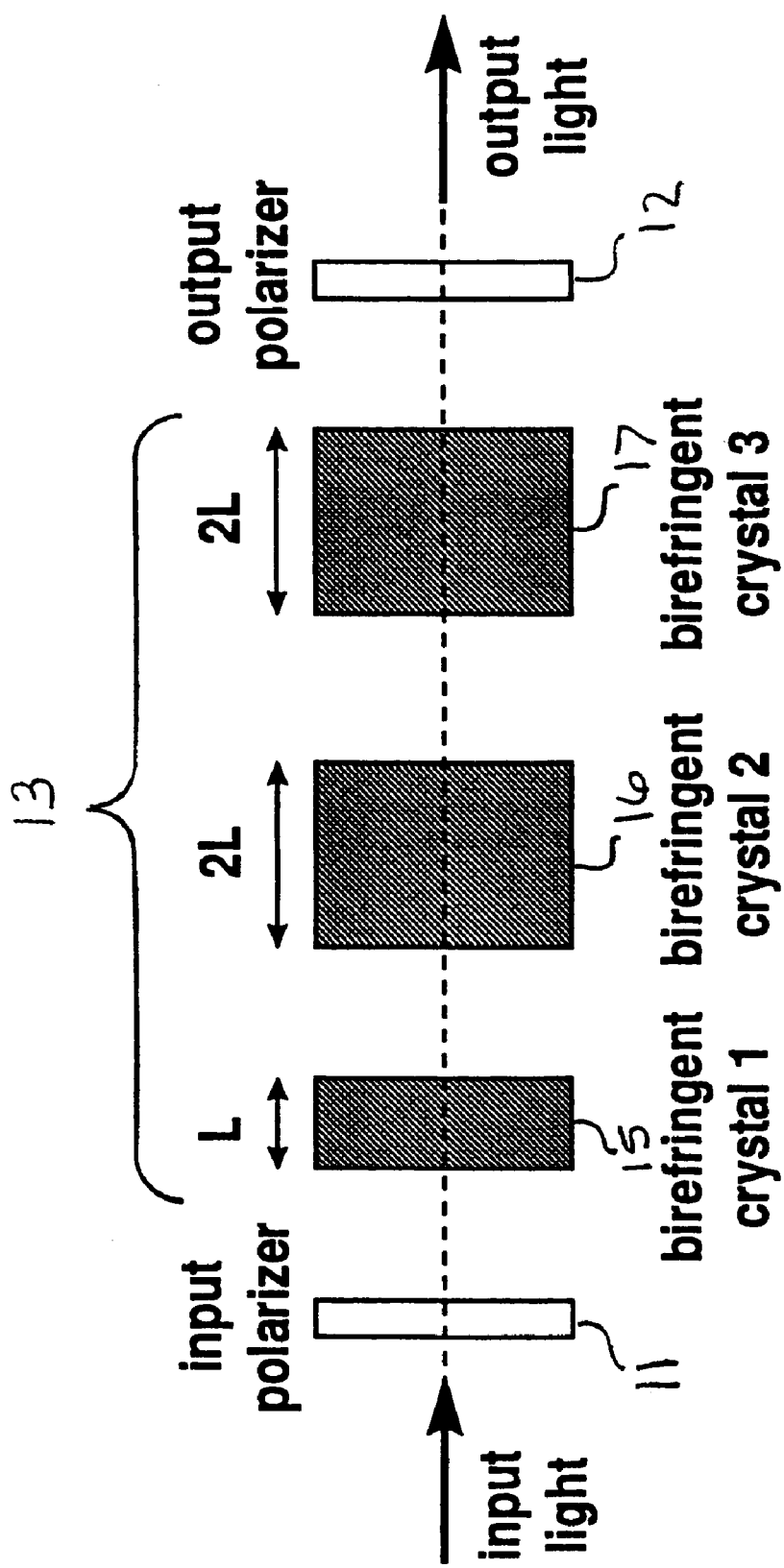
FIG. 1 is a schematic diagram of a contemporary birefringent filter or interleaver.

The detailed description set forth below in connection with the appended drawings is intended as a description of the presently preferred embodiment of the invention and is not intended to represent the only form in which the present invention may be constructed or utilized. The description sets forth the functions of the invention and the sequence of steps for constructing and operating the invention in connection with the illustrated embodiment. It is to be understood, however, that the same or equivalent functions and sequences may be accomplished by different embodiments that are also intended to be encompassed with the spirit and scope of the invention.

The description contained herein is directed primarily to the configuration of an interleaver as a demultiplexer. However, as those skilled in the art will appreciate, the present invention may be used in both demultiplexers and multiplexers. The difference between demultiplexers and multiplexers is small and the configuration of the present invention as either desired device is well within the ability of one of the ordinary skill in the art.

Two different reference systems are used in this patent application for the determination of angular orientations. One reference system is used for the determination of the angular orientations of birefringent elements, such as birefringent crystals, with respect to the polarization direction of input light. Another reference system is used for the determination of the angular orientations of birefringent elements and the angular orientations of waveplates with respect to a moving (x, y, z) coordinate system. Thus, for the birefringent element angular orientations, two separate reference systems are utilized. Thus, when reading the detailed description below, it will be very helpful to understand these two reference systems.

When the angular orientation of a birefringent element is discussed, the angular orientation is typically the fast axis of the birefringent element with respect to the polarization direction of incoming light just prior to the incoming light reaching the birefringent element. Determination of the angular orientation is made by observing oncoming light with the convention that the angle is positive if the rotation of the fast axis is clockwise with respect to the polarization direction of the oncoming light and is negative if the rotation is counter-clockwise with respect to the polarization direction of the oncoming light.

If there is a series of birefringent elements, such as in a birefringent filter, the angular orientations of each of the elements of the filter are measured by their fast axes with respect to the polarization direction of incoming light just prior to the incoming light reaching the first birefringent element of the filter. If there are more than one birefringent filters in a sequence, then the angular orientations are determined separately for each birefringent filter (the angular orientations are measured with respect to the polarization direction of incoming light just prior to the incoming light reaching the first birefringent element of each different filter). Thus, each birefringent filter has its own independent reference for the determination of the angular orientations of the birefringent elements thereof.

By the way of contrast, the angular orientation of birefringent elements and angular orientations of waveplates are also measured by the fast axes of birefringent elements and the optic axes of waveplates with respect to the +x axis. However, it is very important to appreciate that the +x axis is part of the moving coordinate system. This coordinate system travels with the light, such that the light is always traveling in the +z direction and such that the +y axis is always up as shown in the drawings. Thus, when the light changes direction, the coordinate system rotates with the +y axis thereof so as to provide a new coordinate system. The use of such a moving coordinate system allows the optical beam states, the birefringent elements, and the waveplates to be viewed in a consistent manner at various locations in the devices, i.e., always looking into the light, and therefore substantially simplifies viewing and analysis of the devices.

Determination of the angular orientations in (x, y, z) coordinate system is made by observing oncoming light with the convention that the angle is positive if the rotation of the corresponding optical axis is counter-clockwise with respect to +x axis and is negative if the rotation is clockwise with respect to the +x axis (which is consistent with the conventional use of (x, y, z) coordinate system, but which is contrary to the sign convention for determining the angular orientations of birefringent elements with respect to the input polarization direction, as discussed above).

As those skilled in the art will appreciate, an interleaver is an optical device which typically includes at least one birefringent filter. Further, a birefringent filter is one example of a comb filter.

The present invention comprises an interleaver which comprises a birefringent element assembly and a reflector configured so as to direct light which was emitted from the birefringent element assembly back into and through the birefringent element assembly. The birefringent element assembly comprises at least one birefringent element, such as a birefringent crystal. Directing light from the birefringent element assembly back into and through the birefringent element assembly causes the light to be transmitted through the birefringent element assembly twice, one in each of two different opposite directions. By transmitting the light through the birefringent element assembly in both directions, crosstalk can be substantially mitigated. Further, dispersion can be substantially mitigated or eliminated.

Directing light from the birefringent element assembly back into and through the birefringent element assembly is achieved by use of a light reflector. The reflector preferably comprises a single prism. However, those skilled in the art will appreciate that the reflector may alternatively comprise more than one prism and/or one or more mirrors or etalons.

The birefringent element assembly may contain any desired number of birefringent elements, such as birefringent crystals. For example, the birefringent element assembly may contain one, two, three, four, five or more birefringent elements. As those skilled in the art will appreciate, additional birefringent elements tend to enhance the transmission vs. wavelength curve of the birefringent filter or interleaver defined by the birefringent elements, so as to tend to provide a flatter and wider passband and/or so as to provide a deeper and wider stopband.

Preferably, the birefringent element assembly comprises birefringent crystals. However, those skilled in art will appreciate that various other birefringent devices are likewise suitable. For example, spatial birefringent devices (which utilize first and second paths having different physical path lengths and/or different indices of refraction) are likewise suitable.

According to one preferred embodiment of the present invention, the birefringent element assembly is disposed intermediate (in an optical sense) an input polarization beam displacer and an intermediate polarization beam displacer.

According to one preferred embodiment of the present invention, the interleaver comprises an input polarization beam displacer from which light is transmitted to the birefringent element assembly; a first input half-wave waveplate assembly configured to receive light from the input polarization beam displacer and change the light polarization directions; an intermediate polarization beam displacer a configured to transmit light from the birefringent element assembly before the light is transmitted back through the birefringent element assembly; a second input half-wave waveplate assembly configured to control the light polarization direction before the light is transmitted back through the birefringent element assembly; an output half-wave waveplate assembly configured to control the light polarization direction after the light is transmitted back through the birefringent element assembly; and an output polarization beam displacer to which light is transmitted after the light has been transmitted back through the birefringent element assembly.

Thus, the present invention comprises a method for interleaving a light beam, such as for use in multiplexing and de-multiplexing dense wavelength-division multiplex (DWDM) communication signals. The method comprises transmitting a beam of light through a birefringent element assembly in a first direction and then transmitting the beam of light through the same birefringent element assembly in a second direction, which is generally opposite to the first direction. Transmitting the beam of light through the birefringent element assembly in both the first and second directions mitigates crosstalk. Further, dispersion can be mitigated in interleavers having more than a single birefringent element or birefringent crystal.

Referring now to FIG. 1, a Solc birefringent filter can be utilized to construct an interleaver. In a Solc birefringent filter, birefringent element assembly 13 is disposed intermediate two polarizing devices, such as input polarizer 11 and output polarizer 12. The birefringent element assembly may comprise a plurality of birefringent crystals such as first birefringent crystal 15, second birefringent crystal 16 and third birefringent crystal 17. The birefringent crystals have lengths of $L_1$, $L_2$ and $L_3$. According to contemporary practice, such birefringent element assemblies commonly comprise three birefringent crystals, wherein the first birefringent crystal 15 has an angular orientation of 45°, the second birefringent crystal 16 has an angular orientation of $-15°$ and third birefringent crystal 17 has an angular orientation of 10°, all with respect to a polarization direction of the input polarizer 11. Further, according to contemporary practice, the first birefringent crystal 1 has a length $L_1=L$, second birefringent crystal 16 has a length $L_2=2L$, and third birefringent crystal has a length $L_3=2L$. Thus, the second birefringent crystal 16 and the third birefringent crystal 17 provide phase delays ($2\Gamma$) which are approximately twice the phase delay ($\Gamma$) provided by the first birefringent crystal 15.

Although the contemporary birefringent element orientations of 45°, $-15°$ and 10° do provide generally satisfactory transmission characteristics to a certain degree, i.e., provide a generally flat passband, enhanced transmission characteristics can be provided via the use of other sets of angles and phase delays for the birefringent elements.

For example, orientations angles of 45°, $-21°$ and 7° and phase delays $\Gamma$, $2\Gamma$, $2\Gamma$ for the first birefringent element, second birefringent element and third birefringent element, respectively, may alternatively be utilized to provide enhanced passband and stopband characteristics, so as to mitigate undesirable crosstalk between channels in a dense wavelength-division multiplexing (DWDM) optical communication system or the like. The crosstalk can be further reduced by letting optical signals pass through another birefringent filter. But this leads to higher cost due to the doubling in device numbers.

In addition, according to contemporary practice, birefringent filters (wherein light passes therethrough only once and in a single direction) always introduce a finite, undesirably high, amount of dispersion. The dispersion introduced by such contemporary birefringent filters is sufficient to significantly degrade optical signal quality. Because of this degradation in optical signal quality, further advances in channel spacing reduction are difficult, if not impossible.

However, according to the present invention, an interleaver utilizing a birefringent filter is constructed in a manner which substantially mitigates crosstalk without additional birefringent elements. Further, dispersion can be substantially mitigated and eliminated without additional birefringent elements. This is accomplished by configuring the present invention such that light travels through the same birefringent filter twice or more times, in two generally opposite directions. Therefore, the present invention facilitates the construction of an interleaver which makes possible substantially reduced channel spacing, so as to desirably increase the effective bandwidth of an optical medium and thereby enhance the potential for channel count increases.

According to one embodiment of the present invention, a birefringent filter or interleaver can be formed, such that the dispersion vs. wavelength curve thereof is approximately zero for all wavelengths and thus such that the birefringent filter or interleaver itself contributes very little or no dispersion. Therefore, the interleaver of the present invention may be utilized to mitigate total dispersion within an optical system by minimizing its own introduction of undesirable dispersion.

It has been found that if $\phi_1$, $\phi_2$, and $\phi_3$ are the orientation angles for the first, second and third birefringent elements, then the same transmission performance is obtained for birefringent element orientations of $90°-\phi_1$, $90°-\phi_2$ and $90°-\phi_3$, as well as for birefringent element orientations of $90°+\phi_1$, $90°+\phi_2$ and $90°+\phi_3$, respectively. However, the dispersion curves are flipped about the zero dispersion axis for the sets of angles of $90°-\phi_1$, $90°-\phi_2$ and $90°-\phi_3$, as well as $90°+\phi_1$, $90°+\phi_2$ and $90°+\phi_3$, when taken with respect to the orientations of $\phi_1$, $\phi_2$ and $\phi_3$. That is, the dispersion curve of a birefringent filter having birefringent element orientations of $\phi_1$, $\phi_2$ and $\phi_3$ will be opposite the dispersion curve of either a birefringent filter having birefringent element orientations of $90°-\phi_1$, $90°-\phi_2$ and $90°-\phi_3$ or a birefringent filter having birefringent element orientations of $90°+\phi_1$, $90°+\phi_2$ and $90°+\phi_3$.

Therefore, if an optical beam is transmitted through two interleavers sequentially, wherein the two interleavers have been designed such that they have flipped dispersion curves with respect to one another (such as by having the first interleaver utilize birefringent element orientations of $\phi_1$, $\phi_2$ and $\phi_3$ and having the second interleaver utilize birefringent element orientations of $90°-\phi_1$, $90°-\phi_2$ and $90°-\phi_3$ or by having the second interleaver utilize birefringent element orientations of $90°+\phi_1$, $90°+\phi_2$ and $90°+\phi_3$), then the dispersion of the two interleavers cancels and the total dispersion of the two interleavers is zero or approximately zero. However, this configuration requires at least two separate interleavers to achieve zero or approximately zero dispersion for both odd and even channels.

Figure 2:
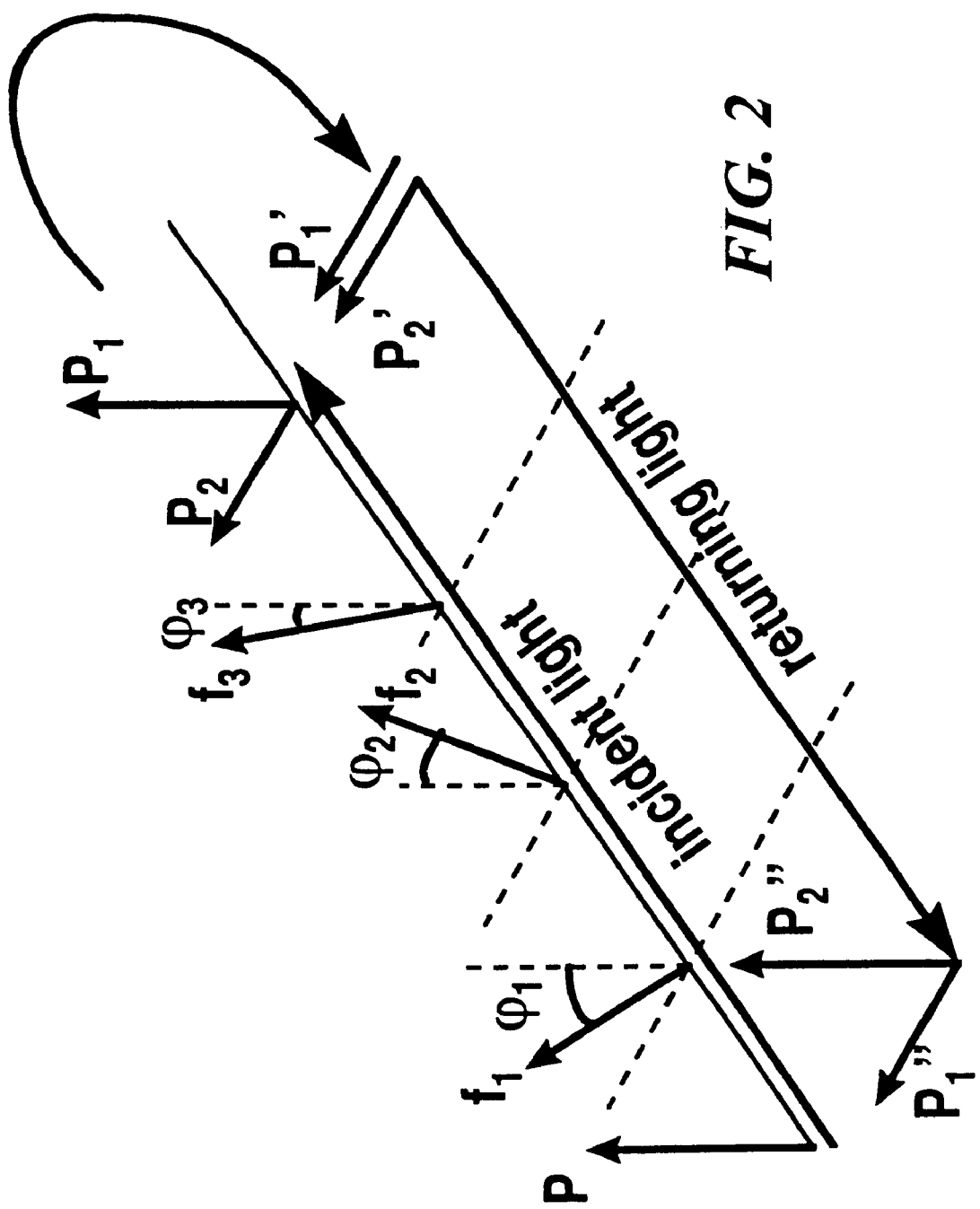
FIG. 2 is a schematic diagram of a fold interleaver configuration according to the present invention, showing birefringent element angular orientations (with respect to a polarization direction of an input light) for incident light and for returning light.

Referring now to FIG. 2, dispersion is substantially mitigated by transmitting a beam of light (incident light as labeled in FIG. 2) through a birefringent element assembly, such as a birefringent element assembly (such as item 13 of FIG. 1) comprising three different birefringent elements or crystals, wherein the first element (such as first birefringent crystal is of FIG. 1) has a fast axis $f_1$ oriented at an angle of $\phi_1$ with respect to a polarization direction of an input light (such as P shown in FIG. 2), a second birefringent element (such as second birefringent crystal 16 of FIG. 1) has a fast axis $f_2$ thereof oriented at an angle of $\phi_2$ with respect to the polarization direction of the input light P and a third birefringent element (such as third birefringent crystal 17 of FIG. 1) has a fast axis $f_3$ thereof oriented at an angle of $\phi_3$ with respect to the polarization direction of the input light P.

After the optical beam passes through the three birefringent elements of FIG. 2, two separate sets of interleaved signals (channels) having polarizations which are orthogonal to one another are obtained. For example, the odd channels may be polarized along the $P_1$ direction and the even channels polarized along the $P_2$ direction. The incident light is reflected, such as by a mirror or prism, and then travels back through the same set of birefringent elements in the reverse direction (and is labeled returning light in FIG. 2). After light has traveled through the birefringent element assembly and before the light travels back through the same birefringent element assembly in the reverse direction, $P_1$ and $P_2$ are aligned so as to be parallel with respect to one another (such as by rotating $P_1$), so as to form $P_1'$ and $P_2'$, which are parallel to one another and are also aligned so as both to be perpendicular with respect to P.

As shown in FIG. 2, when light travels through a birefringent assembly in the first direction, the birefringent element angles are $\phi_1$, $\phi_2$, $\phi_3$, and when light travels through the same birefringent element assembly in the reverse direction, the birefringent element angles are $90°-\phi_3$, $90°-\phi_2$, and $90°-\phi_1$, in the order in which light encounters the birefringent elements and with respect to the polarization direction $P_1'$ and $P_2'$ (which are parallel to one another). As shown in FIG. 2, $P_1'$ and $P_2'$ are perpendicular to P. After being transmitted through the birefringent element assembly in the reverse direction, $P_1''$ and $P_2''$ are provided, which are the odd channels and even channels, respectively.

Thus, it is possible to construct an interleaver which provides approximately zero dispersion and which does not require the use of two separate birefringent filters, as discussed above. Such a zero dispersion interleaver may be constructed by folding the light path (as shown generally in FIG. 2 and as shown more particularly in FIGS. 9 and 11), such that incident light traveling through the birefringent filter in a forward direction is reflected back through the filter in a reverse direction.

Before being transmitted back the birefringent element assembly, $P_1$ is made to be parallel with respect to $P_2$ so as to form $P_1'$ and $P_2'$. However, if dispersion mitigation is not required, then it is not necessary to make $P_1$ parallel with respect to $P_2$, so as to form $P_1'$ and $P_2'$. However, it is necessary that $P_1'$ and $P_2'$ each be either parallel or perpendicular with respect to P (the polarization direction of light input to the birefringent element assembly as shown in FIG. 2) for crosstalk mitigation.

Figure 3:
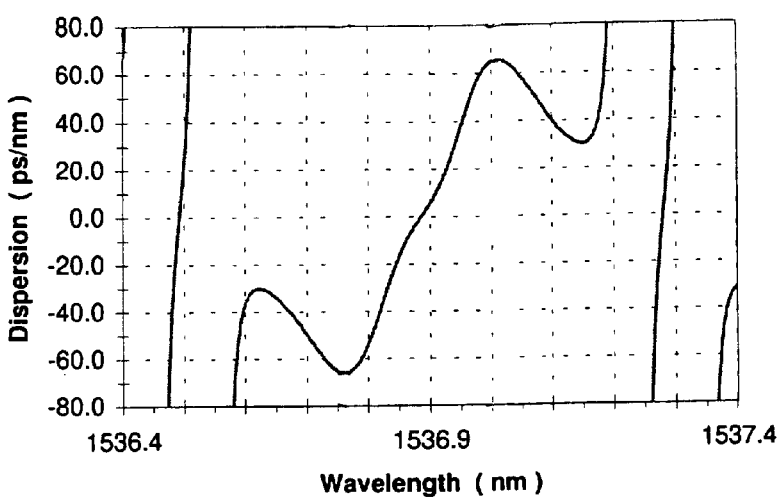
FIG. 3 is a chart showing dispersion vs. wavelength for a three-element 50 GHz non-fold interleaver having birefringent element angular orientations of 45°, −21°, and 7° and having phase delays of Γ, 2Γ and 2Γ, for each of the three birefringent elements, respectively.
Figure 4:
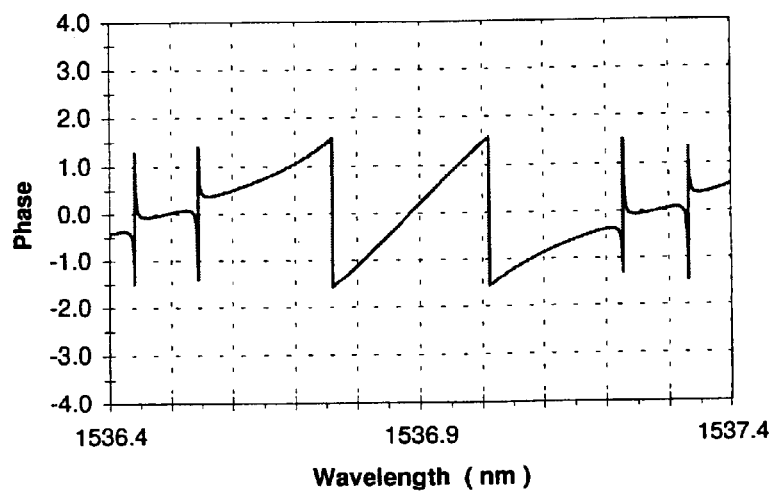
FIG. 4 is a chart showing phase distortion vs. wavelength for a three-element 50 GHz non-fold interleaver having birefringent element angular orientations of 45°, −21°, and 7° and having phase delays of Γ, 2Γ and 2Γ, for each of the three birefringent elements, respectively.
Figure 5:
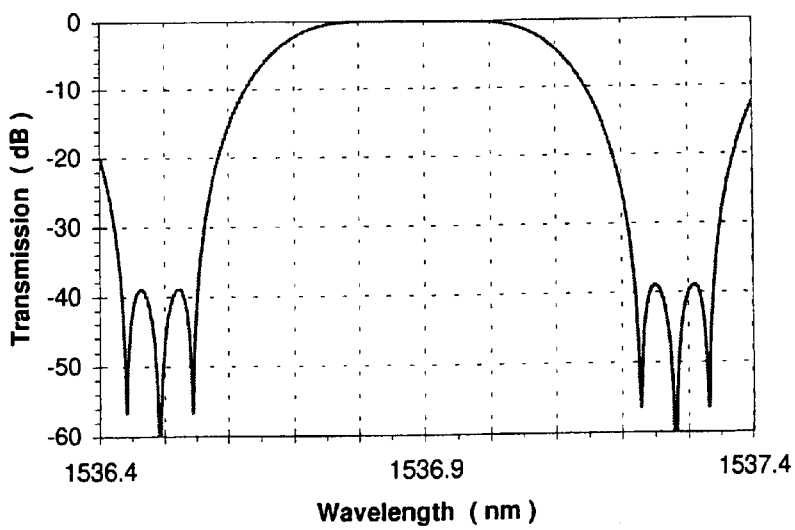
FIG. 5 is a chart showing transmission vs. wavelength for a three-element 50 GHz non-fold interleaver having birefringent element angular orientations of 45°, −21°, and 7° and having phase delays of Γ, 2Γ and 2Γ, for each of the three birefringent elements, respectively.

Referring now to FIGS. 3–5, the dispersion vs. wavelength, phase vs. wavelength and transmission vs. wavelength for a 50 GHz three-element non-fold interleaver having birefringent element orientations of 45°, −21° and 7° and having phase delays of $\Gamma$, $2\Gamma$, $2\Gamma$ respectively, are shown for incident light traveling through the interleaver (and not being reflected back therethrough). As can be easily seen in FIG. 3, the dispersion has non-zero values at various different wavelengths. Thus, this non-fold interleaver introduces undesirable dispersion.

Figure 9:
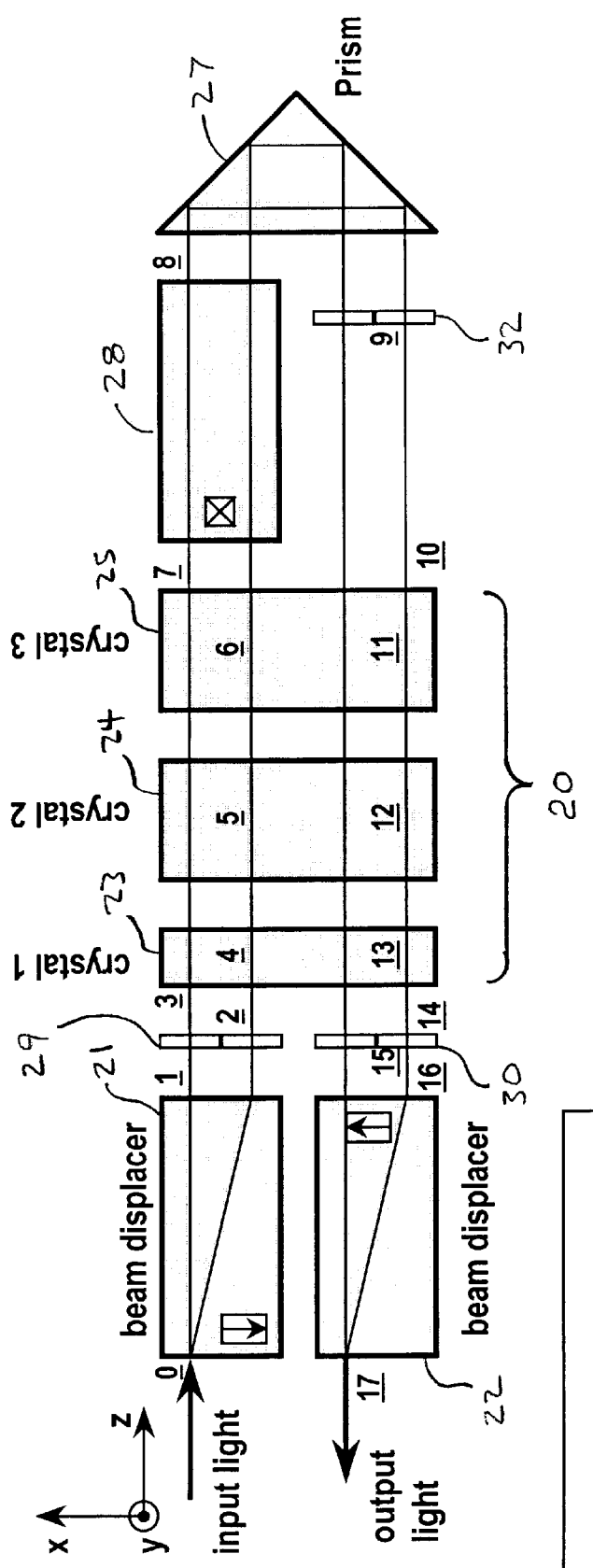
FIG. 9 is a schematic diagram of a three-element fold interleaver according to one embodiment of the present invention wherein a prism is used to cause light to be transmitted back through the birefringent elements.

However, this undesirable dispersion can be minimized or eliminated by aligning the polarization directions of odd channels and even channels in parallel with one another, which is orthogonal to the input polarization direction and by reflecting the incident light back through the same birefringent filter (such as by using the interleaver configuration shown in FIG. 9).

Figure 6:
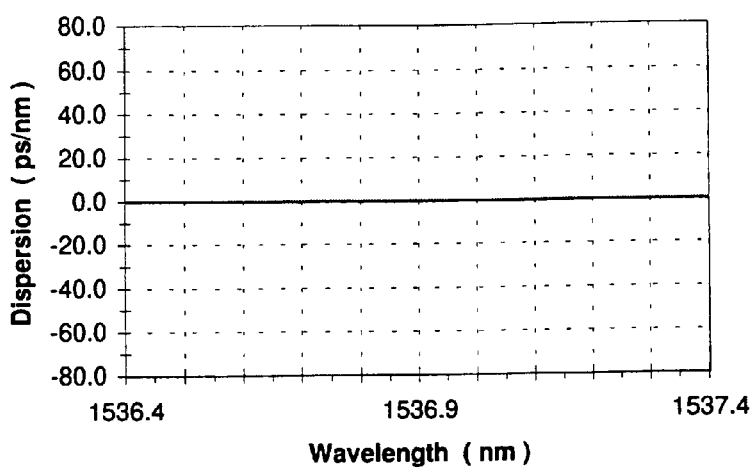
FIG. 6 a chart showing dispersion vs. wavelength for a three-element 50 GHz fold interleaver having birefringent element angular orientations of 45°, −21°, and 7° and having phase delays of Γ, 2Γ and 2Γ, for each of the three birefringent elements, respectively.
Figure 7:
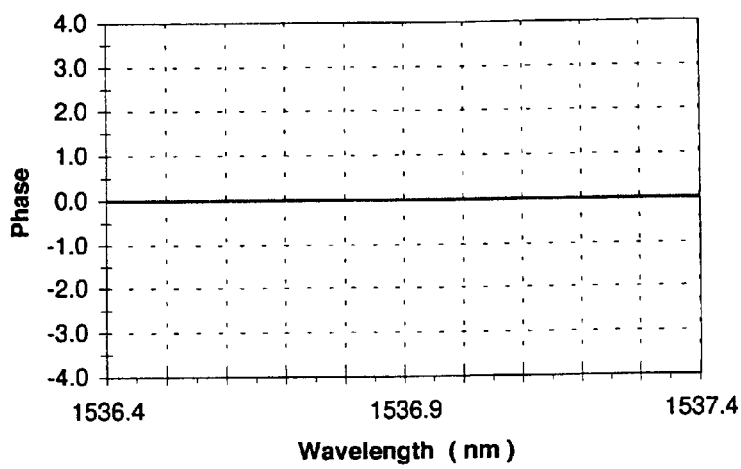
FIG. 7 is a chart showing phase distortion vs. wavelength for a three-element 50 GHz fold interleaver having birefringent element angular orientations of 45°, −21°, and 7° and having phase delays of Γ, 2Γ and 2Γ, for each of the three birefringent element, respectively.
Figure 8:
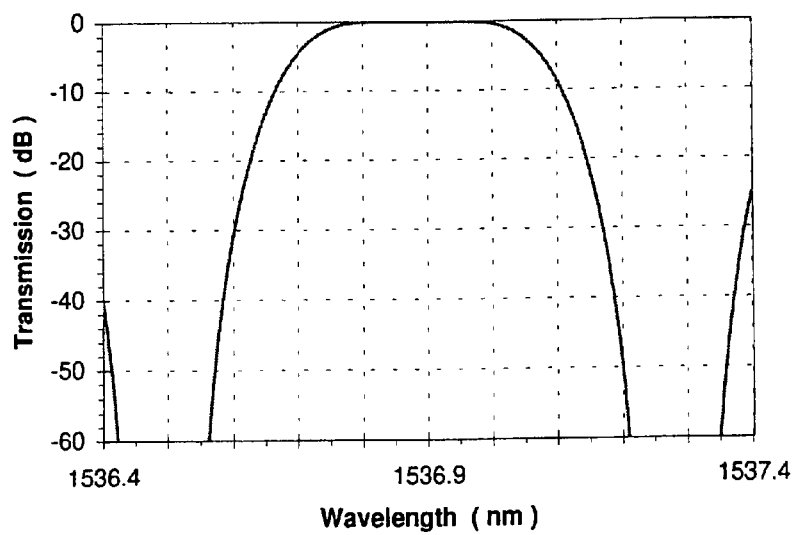
FIG. 8 is a chart showing transmission vs. wavelength for a three-element 50 GHz fold interleaver having birefringent element angular orientations of 45°, −21°, and 7° and having phase delays of Γ, 2Γ and 2Γ, for each of the three birefringent element, respectively.

Referring now to FIGS. 6–8, the dispersion vs. wavelength, phase vs. wavelength, and transmission vs. wavelength curves for a 50 GHz three-element fold interleaver are shown. This may be accomplished by using the birefringent elements that produced the dispersion vs. wavelength curve of FIG. 3 and by aligning $P_1'$ so as to be parallel with respect to $P_2'$ and by aligning both $P_1'$ and $P_2'$ so as to be perpendicular with P and then by reflecting light back through the birefringent elements after the light has already passed therethrough once. The light is transmitted back through the birefringent elements in a direction opposite to the direction in which it was first transmitted.

Thus, as shown in FIG. 6, reflecting the incident light back through the birefringent filter such that returning light is transmitted through the filter in the reverse direction results in approximately zero dispersion for all wavelengths. Similarly, zero phase distortion is provided at all wavelengths, as shown in FIG. 7.

Additionally, as shown in FIG. 8, the depth of the stopband is substantially enhanced, thereby further enhancing filter performance. The stopband of the fold interleaver shown in FIG. 8 has wider −30 dB points than the stopband of the non-fold interleaver shown in FIG. 5 and also has a crosstalk of almost −80 dB.

Referring again to FIG. 2, reflecting the optical beam back through the birefringent element assembly causes the beams to pass through the birefringent elements having orientations of $90°-\phi_3$, $90°-\phi_2$ and $90°-\phi_1$ with respect to the polarization direction of the returning input light. It has been found that swapping the first and third birefringent elements of a three-element birefringent assembly provides identical transmission and dispersion characteristics as those which occur in the non-swapped birefringent filter assembly. Thus, light passing through a birefringent filter having birefringent element orientations of $90°-\phi_3$, $90°-\phi_2$ and $90°-\phi_1$ is equivalent to having the beam pass through a birefringent filter having orientations of $90°-\phi_1$, $90°-\phi_2$ and $90°-\phi_3$. However, a birefringent filter having orientations of $90°-\phi_1$, $90°-\phi_2$ and $90°-\phi_3$, provides flipped dispersion with respect to a birefringent filter having birefringent element orientations of $\phi_1$, $\phi_2$ and $\phi_3$. Thus, when the returning light beam exits the birefringent filter of FIG. 2, both the odd channels (those channels polarized along the $P_1''$ direction) and the even channels (those channels polarized along the $P_2''$ direction) have approximately zero dispersion. That is, such a fold interleaver does not introduce substantial dispersion into an optical signal transmitted therethrough. If desired, the first and third birefringent elements may be swapped with one another.

Referring now to FIG. 9, a three-element fold interleaver is constructed so as to reflect incident light traveling in a first direction therethrough back into the interleaver (or more particularity, back into the birefringent elements of the interleaver) such that returning light travels in a reverse direction therethrough. Half-wave waveplates 32 align $P_1'$ parallel with respect to $P_2'$ and $P_1'$ and $P_2'$ perpendicular with respect to P prior to $P_1'$ and $P_2'$ being transmitted back through the birefringent element assembly 20 in the reverse direction. In FIG. 9, a right-hand coordinate system of axes is used to characterize the optical beam propagation in the system at various locations with a convention that the light is always propagating in the +z direction and the +y direction is always out of the plane of the paper.

The fold interleaver comprises a birefringent element assembly 20 disposed intermediate (in an optical sense) an input polarization beam displacer 21 and an intermediate polarization beam displacer 28. The birefringent element assembly 20 comprises a first birefringent element, such as first birefringent crystal 23; a second birefringent element, such as second birefringent crystal 24; and a third birefringent element, such as third birefringent crystal 25. A reflector, such as one or more mirrors, or such as prism 27 (more than one prism may be utilized, if desired) deflects incident light which has passed through the birefringent element assembly 20 back into and through the birefringent element assembly 20, such that the returning light travels through the birefringent element assembly 20 in a reverse direction. Thus, light travels through the birefringent element assembly 20 in both directions, as discussed in detail above.

Preferably, intermediate polarization beam displacer 28 receives incident light from the birefringent element assembly 20 and transmits the incident light to the prism 27. But, it can be placed between the birefringent element assembly 20 and the prism 27 on the path of returning light.

Preferably, a first input half-wave waveplate assembly 29 comprises two half-wave waveplates disposed intermediate the input polarization beam displacer 21 and the birefringent element assembly 20. The first one of the two half-wave waveplates 29 preferably has an optical axis thereof oriented at an angle of approximately 0° with respect to the +x axis at that location. A second half-wave waveplate of the two half-wave waveplates 29 preferably has an optical axis thereof oriented at an angle of approximately 45° with respect to the +x axis at that location.

In a similar fashion, an output half-wave waveplate assembly 30 comprises four half-wave waveplates disposed intermediate the birefringent element assembly 20 and the output polarization beam displacer 22. A first one of the four half-wave waveplates 30 preferably has an optic axis thereof oriented at an angle of approximately 0° with respect to the +x axis at that location, a second one of the half-wave waveplates 30 preferably has an optic axis thereof oriented at an angle of approximately 45° with respect to the +x axis at that location, a third one of the half-wave waveplates 30 preferably has an optic axis thereof oriented at an angle of approximately 45° with respect to the +x axis at that location and a fourth one of the half-wave waveplates 30 preferably has an optic axis thereof oriented at an angle of approximately 90° with respect to the +x axis at that location.

Preferably, a second input half-wave waveplate assembly 32 comprises four half-wave waveplates disposed intermediate the prism 27 and the birefringent element assembly 20. The first one of the half-wave waveplates 32 preferably has an optic axis thereof oriented at an angle of 45° with respect to the +x axis at that location, a second one of the half-wave waveplates 32 preferably has an optic axis thereof oriented at an angle of approximately 45° with respect to the +x axis at that location, a third one of the half-wave waveplates 32 preferably has an optic axis thereof oriented at an angle of approximately 90° with respect to the +x axis at that location and a fourth one of the half-wave waveplates 32 preferably has an optic axis thereof oriented at an angle of approximately 90° with respect to the +x axis at that location. The positions and orientations of all the half-wave waveplates are provided by FIG. 10.

Figure 10:
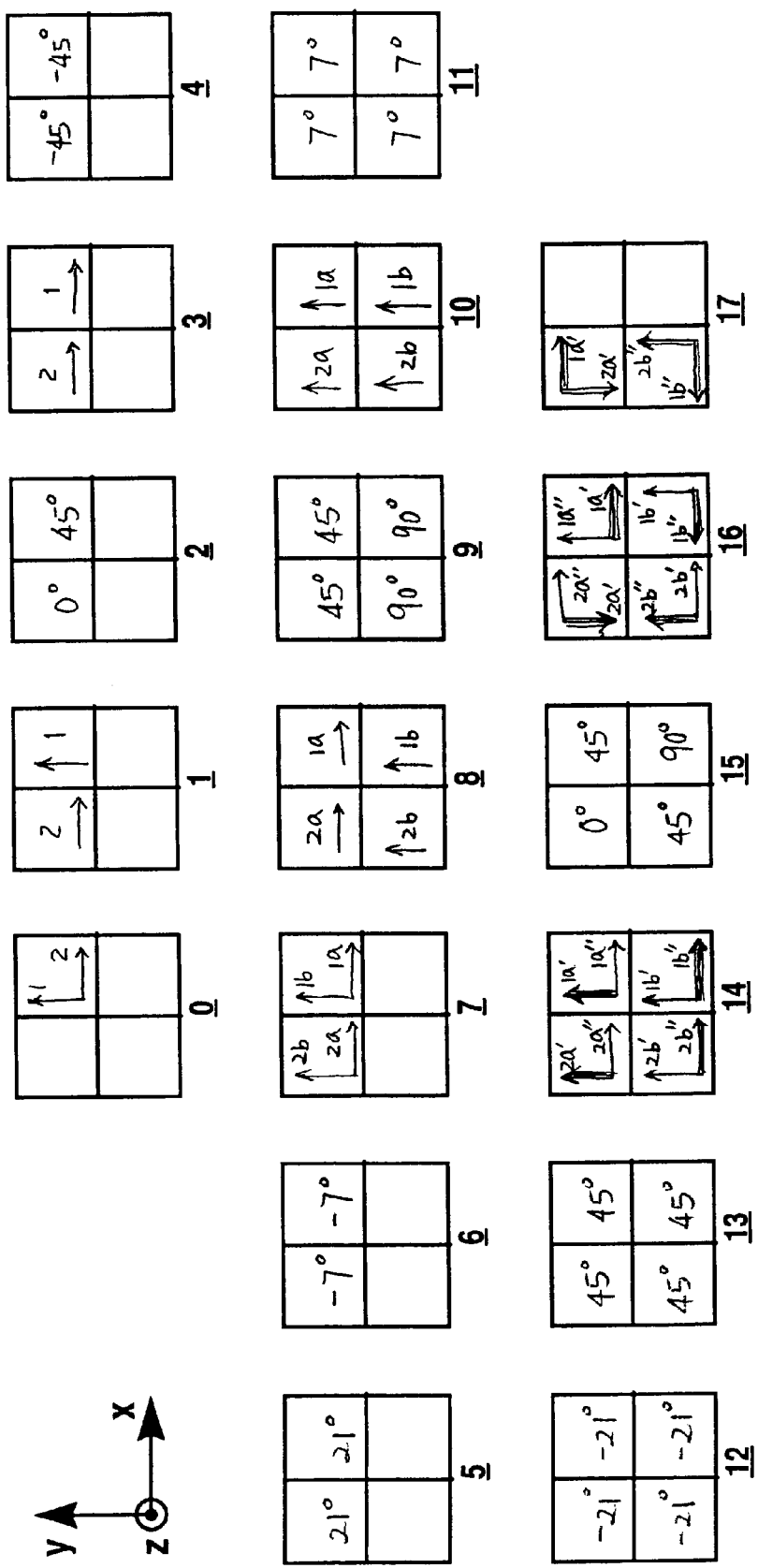
FIG. 10 is a series of frames showing the optical beam states, the crystal orientations and the half-wave waveplate orientations at different locations in an exemplary fold interleaver of FIG. 9.

Referring now to FIG. 10, the optical beam states, the crystal orientations and the half-wave waveplate orientations at various locations in an exemplary fold interleaver of FIG. 9 are shown. Each frame of FIG. 10 has an underlined number associated therewith which corresponds to a location in the interleaver of FIG. 9 having the same underlined number. Each of the four boxes of a frame corresponds to a physical beam position at the various locations. The polarization beam displacers 21, 22 and 28 shift the optical beams between these beam positions according to the orientation of the polarization beam displacer 21, 22 and 28 and the polarization of the optical beam transmitted therethrough.

It is worthwhile to appreciate that polarization beam displacers 21 and 22 may be either separate polarization beam displacers or may be the same polarization beam displacer, since they are located at approximately at the same position and have the same optical properties. Of course, utilizing a common polarization beam displacer rather than two separate polarization beam displacers may be desirable so as to reduce materials and assembly costs.

According to the exemplary embodiment of a fold interleaver described by FIG. 10, angles of 45°, −21° and 7° for the birefringent element orientations and phase delays of Γ, 2Γ, 2Γ are utilized. However, those skilled in the art will appreciate that various other angles and phase delays may be utilized. Generally, dispersion cancellation will be achieved via the folded configuration of the interleaver (wherein light from the birefringent element assembly is transmitted back therethrough) and by properly aligning the polarization directions of the odd channels and the even channels before transmitting them back through the birefringent element assembly regardless of the angular orientations of the birefringent elements.

For the fold interleavers shown in FIG. 9, a brief discussion of the optical beam states, crystal orientations and half-wave waveplate orientations (as shown in FIG. 10) may be beneficial. At location 0 an input composite optical beam has two linearly polarized components 1 (along the y direction) and 2 (along the x direction) at the top right beam position. After the beam propagates through the polarization beam displacer 21 to location 1, component 2 shifts to the top-left beam position and component 1 remains at the top-right beam position. The arrows shown on the polarization beam displacers indicate the beam shift direction for the beam displacers of FIG. 9.

After components 1 and 2, respectively, pass through two half-wave waveplates at location 2, the linearly polarized components 1 and 2 become polarized along the +x axis at location 3. At location 2, the optical axis of the half-wave waveplate for component 1 is oriented at 45° with respect to the +x axis and the optical axis of the half-wave waveplate for component 2 is oriented at 0° with respect to the +x axis. At location 4, the first birefringent crystal is oriented with its fast axis at −45° with respect to the +x axis. The crystal orientations for crystals 2 and 3 are shown at locations 5 and 6, respectively. At location 7, the vertically polarized (y direction) components correspond to one set of the interleaved channels, e.g., the even channels, and the horizontally polarized (x direction) components correspond to another set of interleaved channels, e.g., the odd channels. After they pass through the intermediate polarization beam displacer 28, the vertically polarized beams move to the bottom beam positions as shown at location 8.

After the light components have been reflected by the prism 27 and have passed through the half-wave waveplates 32, the polarization direction for all of the components have been changed to or remain at the y direction at location 10.

On the return path through the birefringent element assembly 20, the crystal orientations do not change, since the same birefringent crystals are used. The +x axis changes its direction with respect to the crystals, because the coordinate system travels along with the optical beams. The crystal orientation angles, with respect to the +x axis, are changed conventionally. One needs to note that the polarization directions are all vertical at location 10. By way of comparison, the polarization directions are horizontal at location 3. As discussed above, when the optical beams pass through the birefringent element assembly 20 forward and backward, zero, or nearly zero, dispersion is provided.

At location 14, the 1a' and 2a' components are the corresponding odd channels and 1a" and 2a" components are the crosstalk noise from the even channels (typically very small). The 1b" and the 2b" components are the corresponding even channels and 1b' and 2b' components are the crosstalk noise from the odd channels (typically very small). Thick arrows (such as those of frames 14, 16 and 17) are used to indicate the desired (non-crosstalk) signal and thin arrows are used to indicate crosstalk when thick arrows are present.

Using the half-wave waveplates at location 15 and the output polarization beam displacer 22, the two output beams 1a' and 2a' as well as 1b" and 2b" are combined at location 17. The two output beams (1a', 2a' and 1b", 2b") are the two series of interleaved channels with zero dispersion. Since the same crystals are used in the fold interleaver for both the incident light path and the returning light path, zero dispersion is achieved at a low cost, and in a small device. Further, using the same set of birefringent crystals in both instances mitigates alignment requirements.

Since light travels through the birefringent element assembly and is then subsequently reflected back through the birefringent element assembly in a reverse direction, an effect equivalent to passing through two different birefringent element assemblies is achieved. That is, the number of birefringent elements is effectively doubled according to the present invention without actually having to double the number of birefringent elements. Indeed, the present invention may optionally be configured so as to cause light to travel through the birefringent element assembly 3, 4, 5, 6 or any other desired number of times, so as to further enhance the transmission characteristics of the interleaver.

As those skilled in the art will appreciate, when dispersion mitigation is desired, then light will be reflected though the birefringent element assembly an even number of times such that the dispersion introduced by light traveling in one direction through the birefringent element assembly is substantially cancelled by dispersion introduced by light traveling in the opposite direction. When dispersion mitigation is not required, then the present invention may be configured such that light passes there through an odd number of times.

It is worthwhile to note that the folded configuration of the interleaver of the present invention automatically matches elements between successive stages of birefringent filtering for effective mitigation of crosstalk and/or dispersion. That is, each pass through the birefringent assembly in a direction opposite to the previous pass therethrough apparently occurs through a birefringent element assembly which is perfectly matched to the birefringent element assembly which the light previously pass through since the light passes through the same birefringent element assembly in both instances.

Because the beam shift (by the beam displacers) is symmetric in the apparatus, the polarization mode dispersion (PMD) is minimized.

The exemplary fold interleaver shown in FIG. 9 is a three-element interleaver utilizing a birefringent element assembly 20 which comprises three separate birefringent elements or crystals. As those skilled in the art will appreciate, interleavers having more than three birefringent elements may alternatively be utilized so as to provide enhanced passband and stopband characteristics. Generally, the more elements utilized in a birefringent filter or interleaver, the better the passband and stopband characteristics thereof.

On the other hand, the interleaver may be simplified by providing only one or two birefringent elements. Although the transmission characteristics will tend to suffer when fewer birefringent elements are utilized, there may be instances wherein adequate transmission characteristics are provided at the advantageously lower cost associated with fewer stages. Thus, for example, one or two birefringent crystals may alternatively be utilized, rather than three birefringent crystals as shown in FIG. 9.

Figure 11:
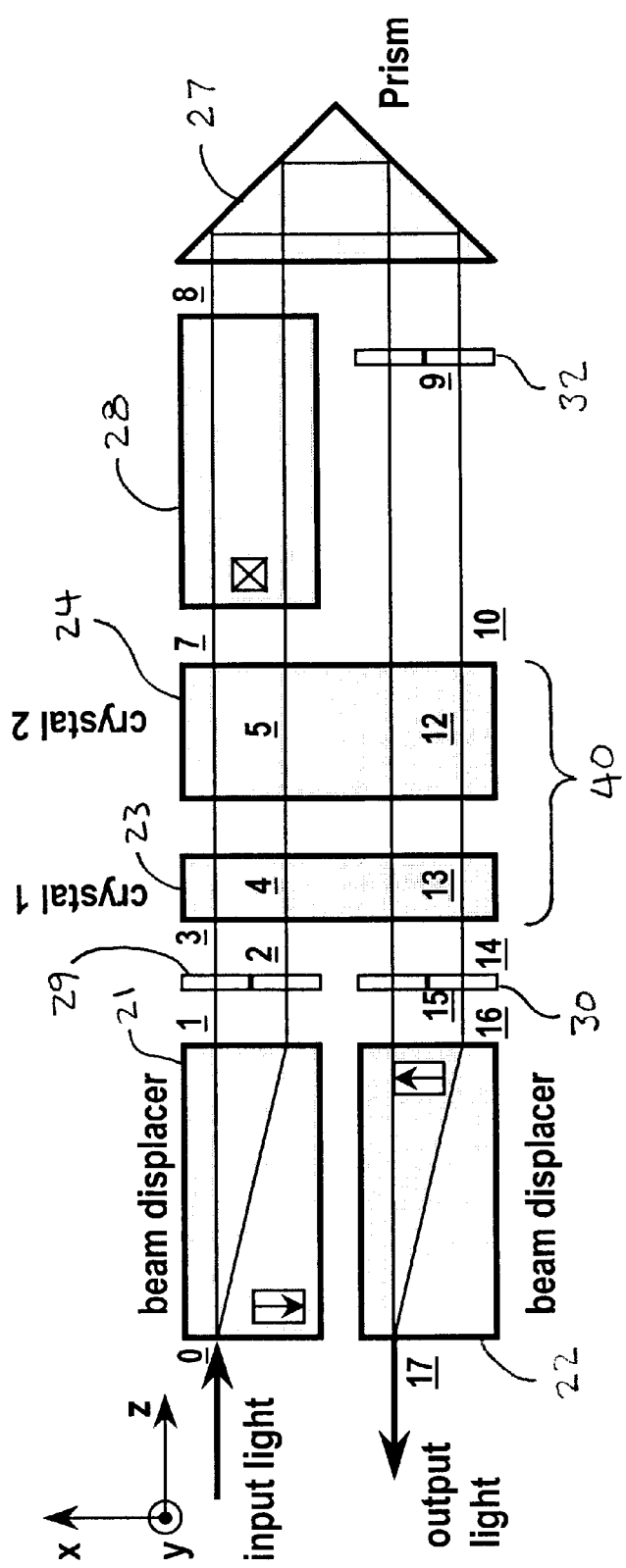
FIG. 11 is a schematic diagram of a two-element fold interleaver according to another embodiment of the present invention wherein a prism is used to cause light to be transmitted back through the birefringent elements.

Referring now to FIG. 11, a schematic top view of an exemplary fold interleaver having two birefringent elements is shown. That is, the birefringent element assembly 20 thereof comprises only a first birefringent element or crystal 23 and a second birefringent element or crystal 24. However, light is reflected through the two birefringent crystals in both directions, as it is in the fold interleaver of FIG. 9.

Figure 12:
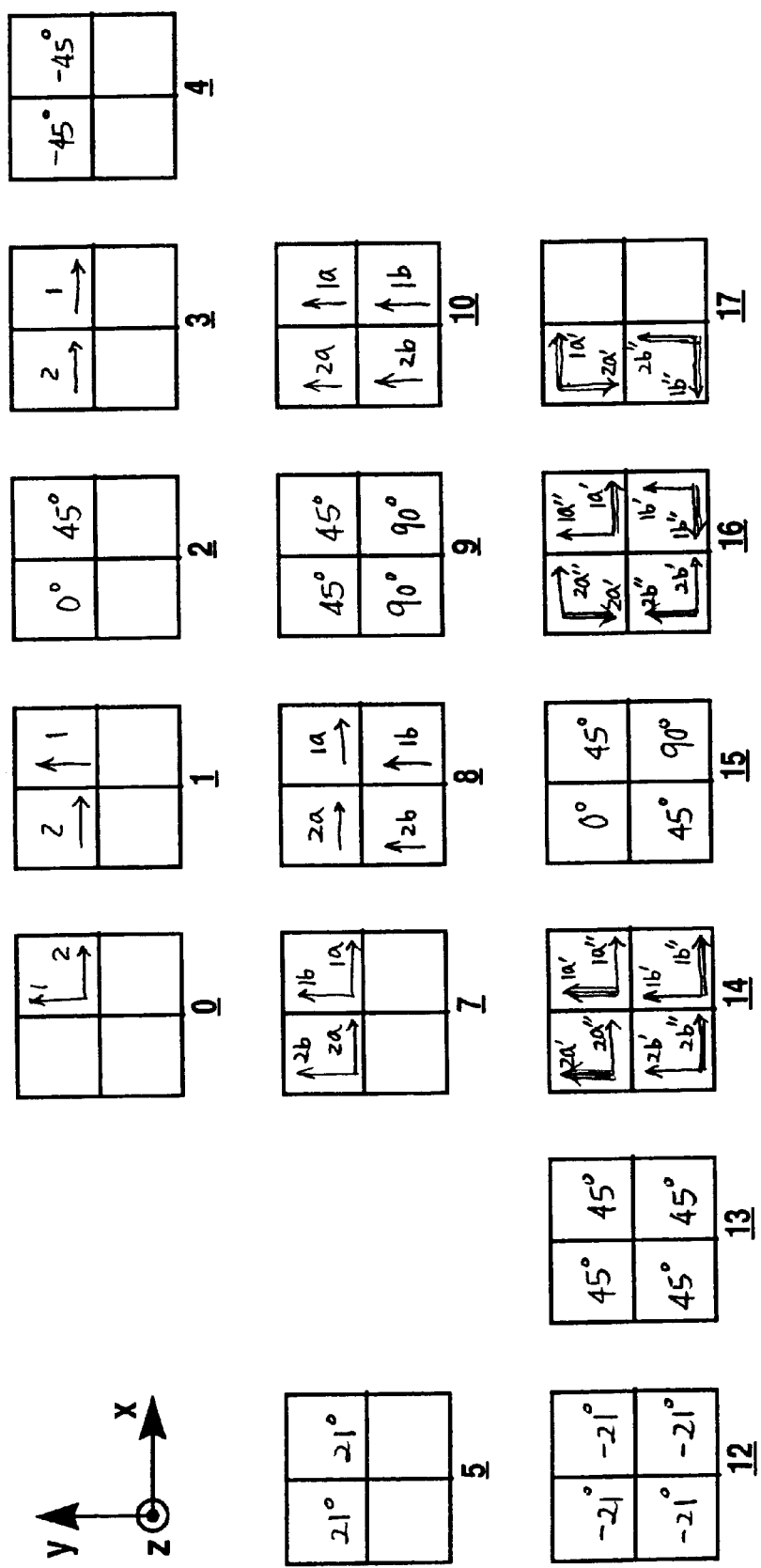
FIG. 12 is a series of frames showing the optical beam states, the crystal orientations and the half-wave waveplate orientations at different locations in an exemplary fold interleaver of FIG. 11.

Referring now to FIG. 12, the optical beam states, the crystal orientations, and the half-wave waveplate orientations at various locations in an exemplary two-element fold interleaver of FIG. 11 are shown with birefringent element orientations of 45° and −15° and phase delays of Γ and 2Γ, respectively.

Figure 13:
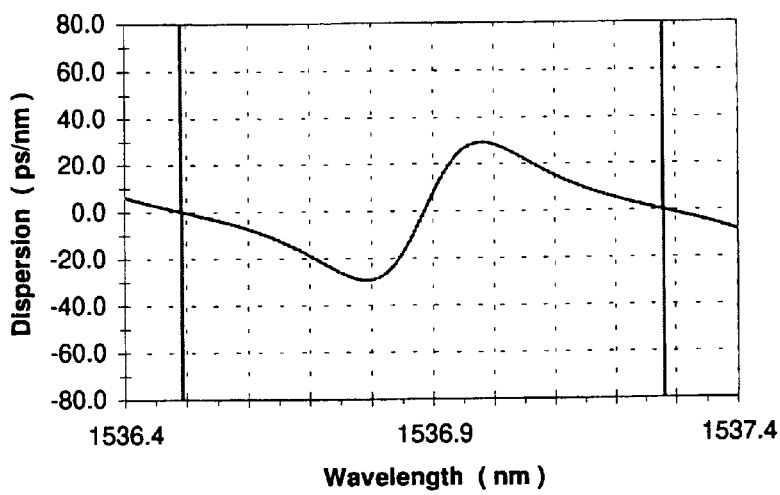
FIG. 13 a chart showing dispersion vs. wavelength for a two-element 50 GHz non-fold interleaver having birefringent element angular orientations of 45° and −15° and having phase delays of Γ and 2Γ for each of the two birefringent elements, respectively.
Figure 14:
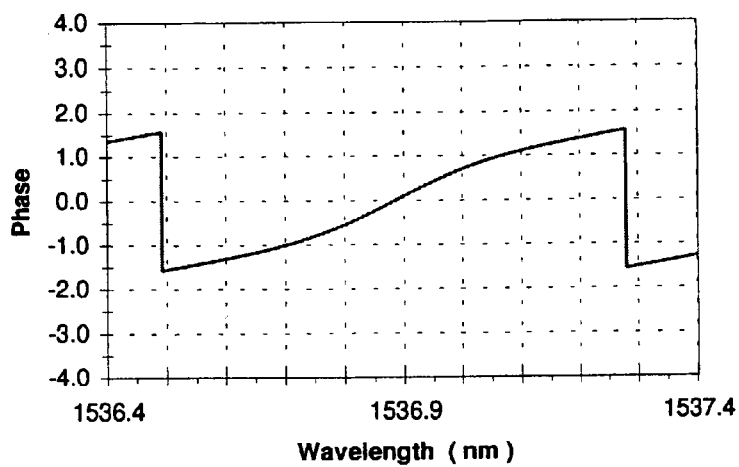
FIG. 14 is a chart showing phase distortion vs. wavelength for a two-element 50 GHz non-fold interleaver having birefringent element angular orientations of 45° and −15° and having phase delays of Γ and 2Γ for each of the two birefringent elements, respectively.
Figure 15:
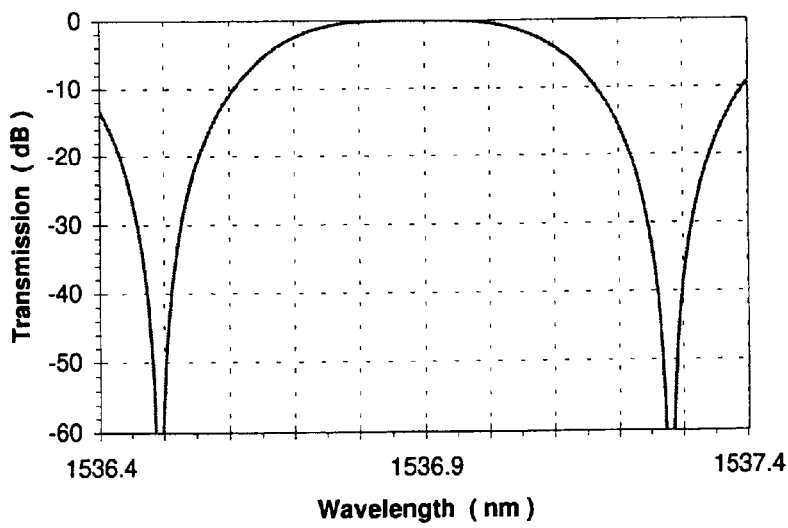
FIG. 15 is a chart showing transmission vs. wavelength for a two-element 50 GHz non-fold interleaver having birefringent element angular orientations of 45° and −15° and having phase delays of Γ and 2Γ for each of the two birefringent elements, respectively.

Referring now to FIGS. 13–15, the dispersion vs. wavelength, phase distortion vs. wavelength and transmission vs. wavelength curves are shown, respectively, for a 50 GHz two-element non-fold interleaver with birefringent element orientations of 45° and −15° and phase delays of Γ and 2Γ, respectively.

Figure 16:
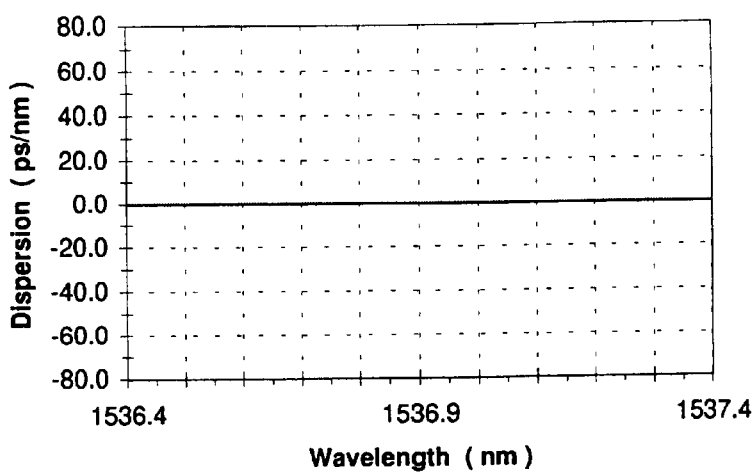
FIG. 16 a chart showing dispersion vs. wavelength for a two-element 50 GHz fold interleaver having birefringent element angular orientations of 45° and −15° and having phase delays of Γ and 2Γ for each of the two birefringent elements, respectively.
Figure 17:
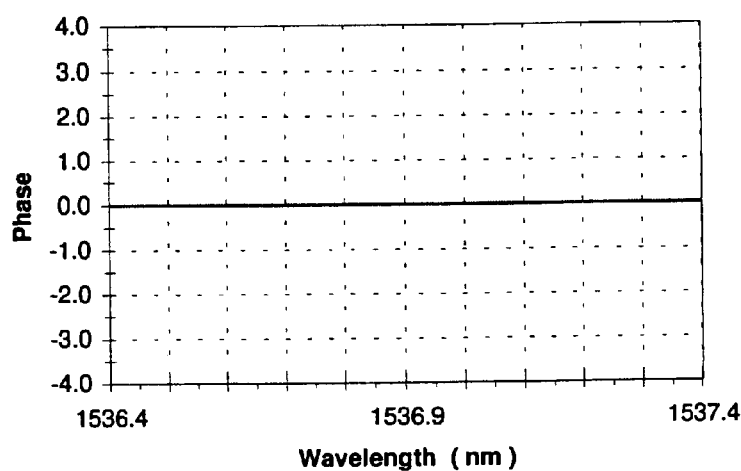
FIG. 17 is a chart showing phase distortion vs. wavelength for a two-element 50 GHz fold interleaver having birefringent element angular orientations of 45° and −15° and having phase delays of Γ and 2Γ for each of the two birefringent elements, respectively.
Figure 18:
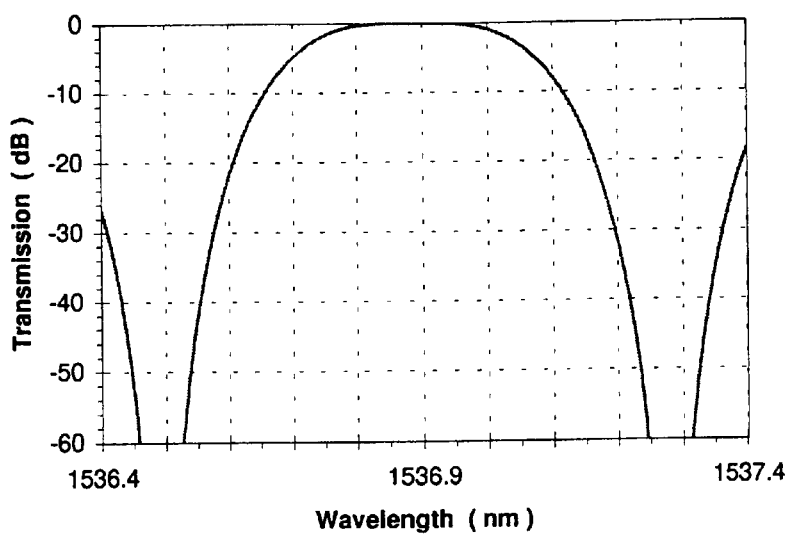
FIG. 18 is a chart showing transmission vs. wavelength for a two-element 50 GHz fold interleaver having birefringent element angular orientations of 45° and −15° and having phase delays of Γ and 2Γ for each of the two birefringent elements, respectively.

FIGS. 16–18 show the dispersion vs. wavelength, phase distortion vs. wavelength and transmission vs. wavelength curves for a 50 GHz two-element fold interleaver having birefringent element orientations of 45° and −15° and phase delays for Γ and 2Γ, respectively.

A comparison of FIG. 13 and FIG. 16 clearly shows the advantages of a fold interleaver with respect to a non-fold interleaver. The dispersion shown in FIG. 13 is substantial, while the dispersion shown in FIG. 16 is approximately zero. Thus, a low or zero dispersion interleaver comprising only two birefringent elements can be provided according to the present invention.

Figure 19:
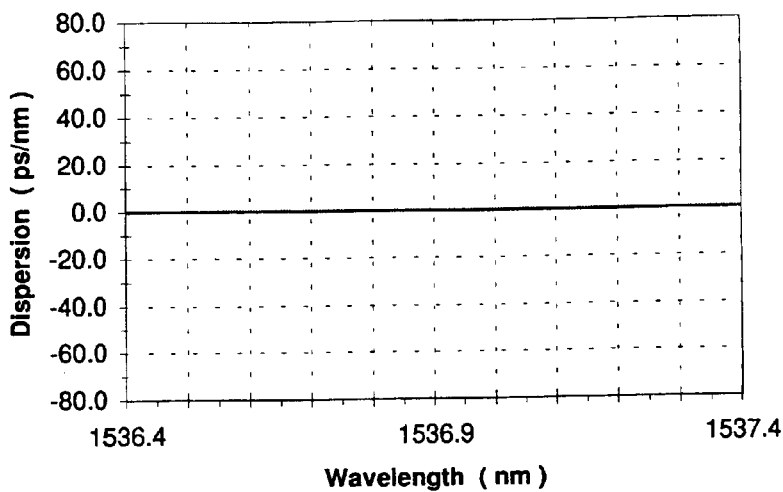
FIG. 19 a chart showing dispersion vs. wavelength for a one-element 50 GHz non-fold interleaver having a birefringent element angular orientation of 45°.
Figure 20:
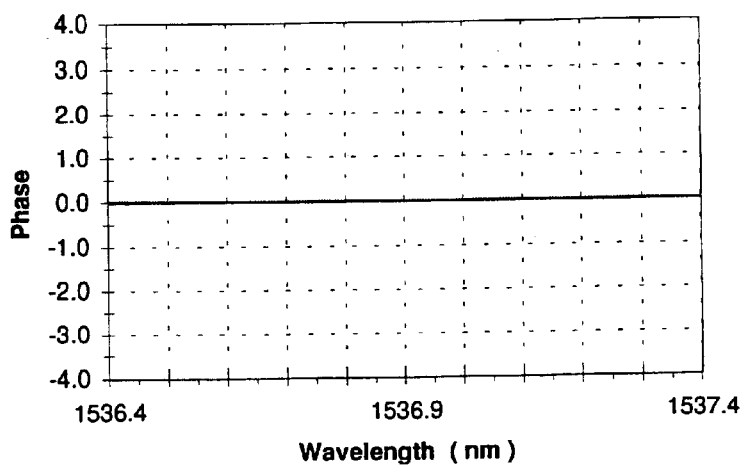
FIG. 20 is a chart showing phase distortion vs. wavelength for a one-element 50 GHz non-fold interleaver having a birefringent element angular orientation of 45°.
Figure 21:
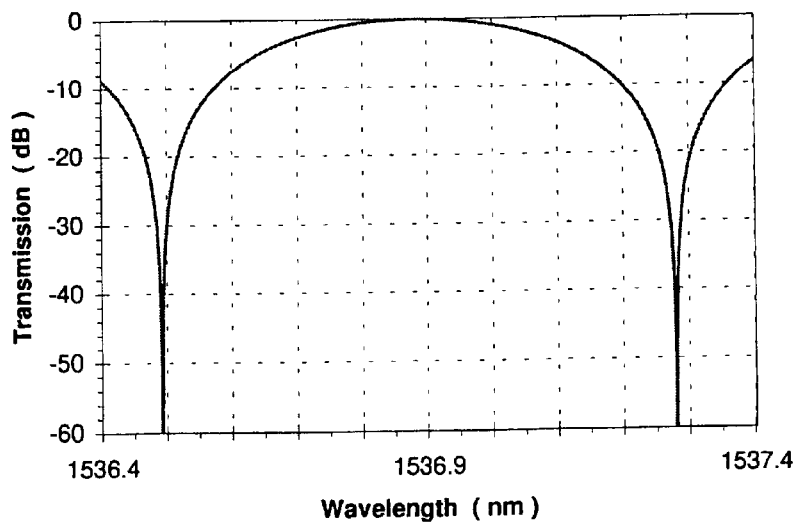
FIG. 21 is a chart showing transmission vs. wavelength for a one-element 50 GHz non-fold interleaver having a birefringent element angular orientation of 45°.

Referring now to FIGS. 19–21, a dispersion vs. wavelength curve, a phase distortion vs. wavelength curve and a transmission vs. wavelength curve are provided for a non-fold interleaver having only one birefringent element or crystal. The birefringent element has an angular orientation of 45°. It is worthwhile to note that the dispersion of a single element non-fold birefringent filter or interleaver is approximately zero. That is, all single element birefringent filters or interleavers generally have approximately zero dispersion, whether they utilize a fold configuration or not. Thus, providing a fold single element interleaver generally does not enhance dispersion mitigation therefor.

Figure 22:
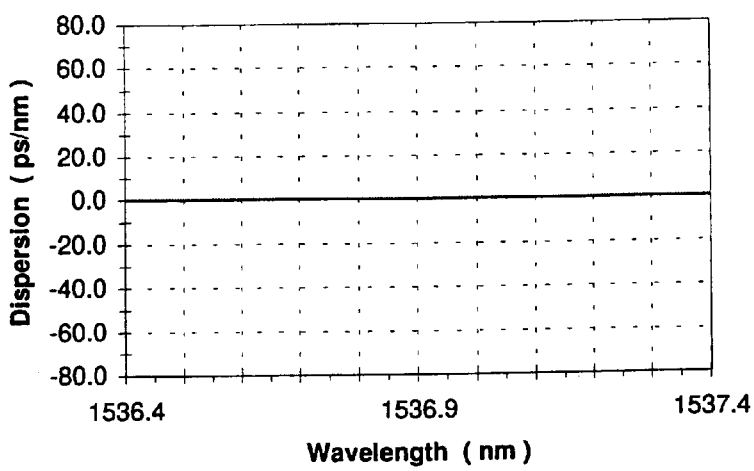
FIG. 22 a chart showing dispersion vs. wavelength for a one-element 50 GHz fold interleaver having a birefringent element angular orientation of 45°.
Figure 23:
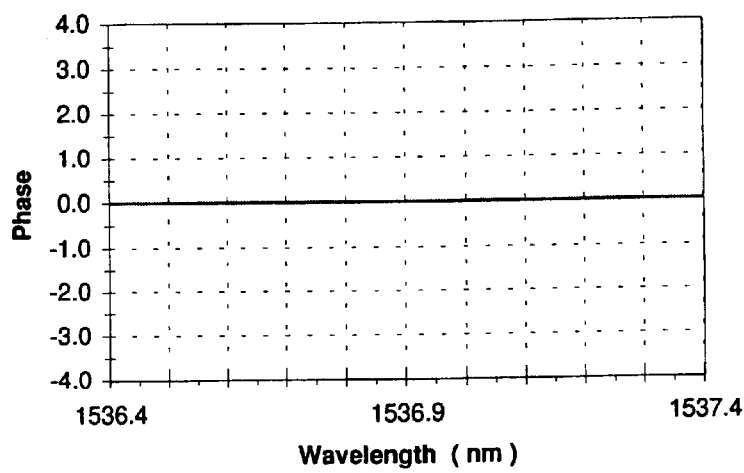
FIG. 23 is a chart showing phase distortion vs. wavelength for a one-element 50 GHz fold interleaver having a birefringent element angular orientation of 45°.
Figure 24:
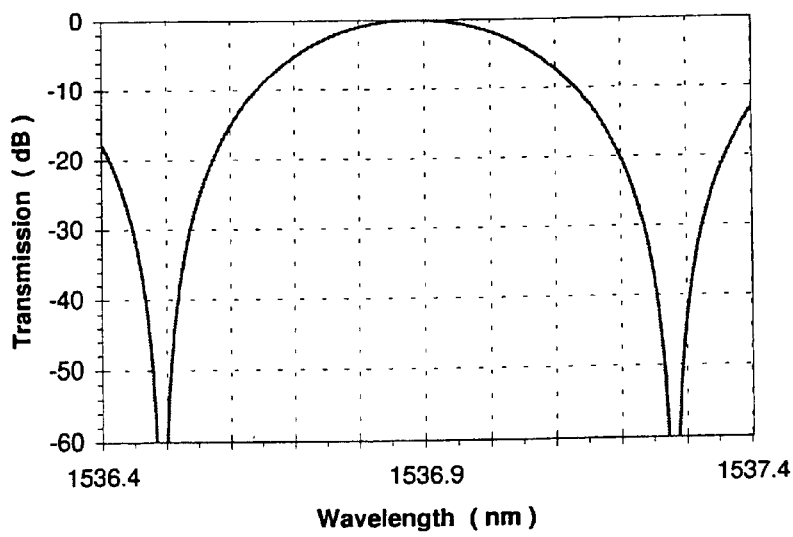
FIG. 24 is a chart showing transmission vs. wavelength for a one-element 50 GHz fold interleaver having a birefringent element angular orientation of 45°.
Figure 25:
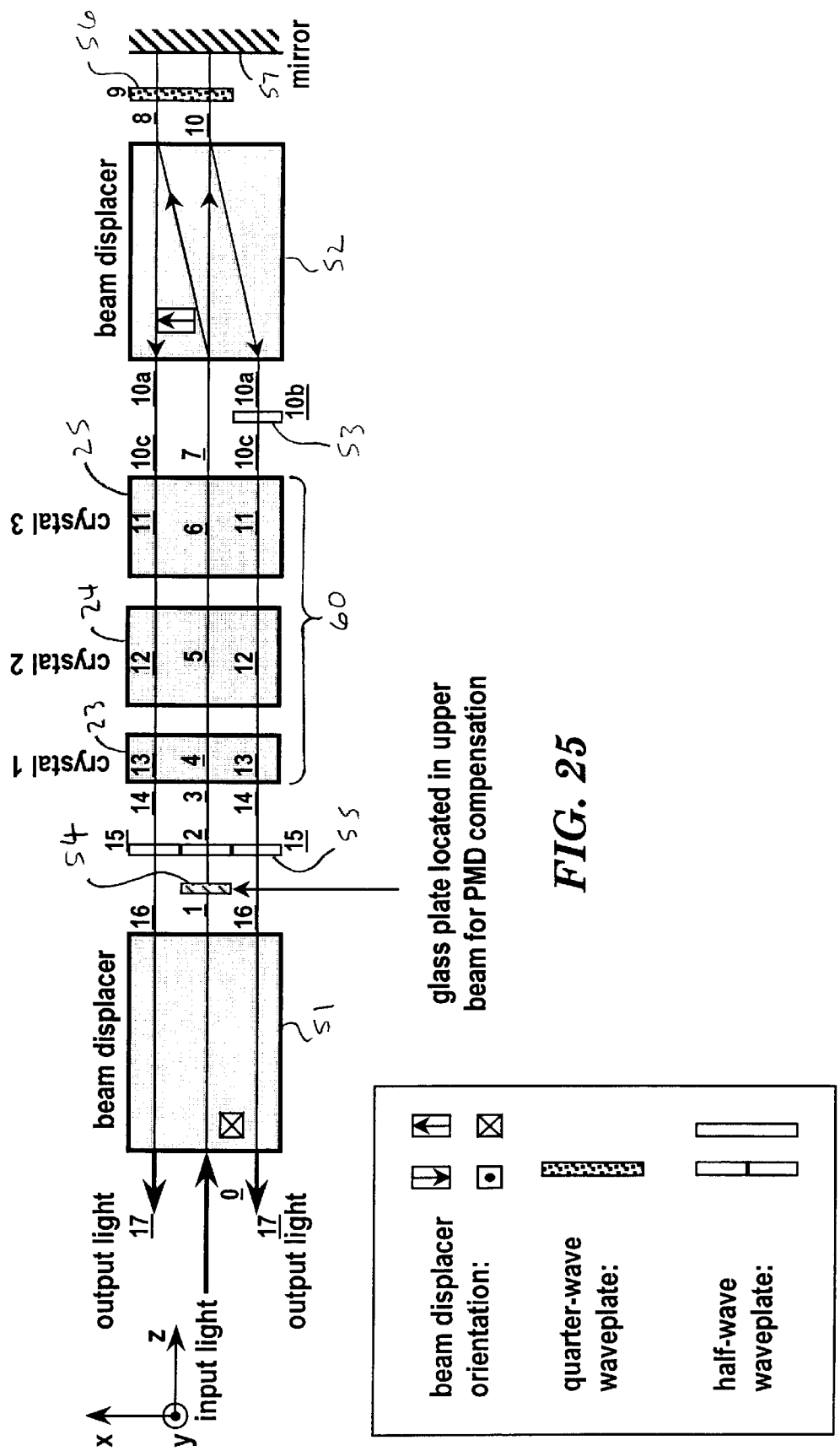
FIG. 25 is a schematic diagram of a three-element fold interleaver according to another embodiment of the present invention, wherein a mirror is used to cause light to be transmitted back through the birefringent elements.

Referring now to FIGS. 22–24, a dispersion vs. wavelength curve, phase distortion vs. wavelength curve and the transmission vs. wavelength curve for a single element 50 GHz fold interleaver are provided. The single birefringent element again has an angular orientation of 45°. Although utilizing a folded configuration for a single element interleaver does not tend to enhance dispersion mitigation therefor, the folded configuration does cause the light beam to travel through the birefringent element twice, thereby, at least in some instances, providing enhanced transmission characteristics. A comparison of the transmission vs. wavelength curve of FIG. 24 for the folded interleaver with the transmission vs. wavelength curve of FIG. 21 for the non-folded interleaver shows that the stopbands of the folded interleaver tend to be wider and deeper than the stopbands for the non-folded interleaver. Thus, at least in some applications, it may be beneficial to provide a single element folded interleaver. Referring now to FIG. 25, a fold interleaver utilizing a mirror 57 rather than a prism is shown. Light input to the interleaver enters a first beam displacer 51, which is preferably both an input and output beam displacer. Light from the input/output polarization beam displacer 51 passes through the birefringent element assembly 60, which comprises three birefringent elements or crystals. The light then passes through an intermediate beam displacer 52. Light from the intermediate beam displacer 52 is reflected back through the interleaver by mirror 57 such that the light passes through the birefringent element assembly 60 in the opposite direction. The intermediate beam displacer 52 separates light into two orthogonally polarized components. After being reflected back toward the interleaver by mirror 57, the lowermost component (that component which is displaced downwardly by intermediate beam displacer 52 after being reflected by mirror 57) passes through half-wave waveplate 53 prior to reentering the birefringent element assembly 60. After the lowermost component exits the birefringent element assembly 60, the lowermost component (as well as the uppermost component—that component which is not displaced downwardly upon reentering the intermediate beam displacer 52) passes through half-wave waveplate 55. Both the lowermost component and the uppermost component pass through quarter-wave waveplate 56 as they travel from the intermediate beam displacer 52 to the mirror 57 and again as they travel from the mirror 57 back to the intermediate beam displacer 52.

Referring now to FIG. 25, a fold interleaver utilizing a mirror 57 rather than a prism is shown. Light input to the interleaver enters a first beam displacer 51, which is preferably both an input and output beam displacer. Light from the input/output polarization beam displacer 51 passes through the birefringent element assembly 60, which comprises three birefringent elements or crystals. The light then passes through an intermediate beam displacer 52. Light from the intermediate beam displacer 52 is reflected back through the interleaver by mirror 57 such that the light passes through the birefringent element assembly 60 in the opposite direction. The intermediate beam displacer 52 separates light into two orthogonally polarized components. After being reflected back toward the interleaver by mirror 57, the lowermost component (that component which is displaced downwardly by intermediate beam displacer 52 after being reflected by mirror 57) passes through half-wave waveplate 53 prior to reentering the birefringent element assembly 60. After the lowermost component exits the birefringent element assembly 60, the lowermost component (as well as the uppermost component—that component which is not displaced downwardly upon reentering the intermediate beam displacer 52) passes through half-wave waveplate 55. Both the lowermost component and the uppermost component pass through quarter-wave waveplate 56 as they travel from the intermediate beam displacer 52 to the mirror 57 and again as they travel from the mirror 57 back to the intermediate beam displacer 52.

Alternatively, separate beam displacers may be utilized (such as one beam displacer for input light and two separate beam displacers for output light). After exiting the input beam displacer 51, the upper beam of light passes through glass plate 54 which compensates for a difference in paths lengths between the upper beam and the lower beam. As those skilled in the art will appreciate, without the glass plate 54 the upper beam has a shorter optical path length since the lower beam was displaced by the input polarization beam displacer 51 and therefore traveled further therein. By compensating for this difference in optical path length, the glass plate 54 mitigates undesirable polarization mode dispersion (PMD) within the interleaver. The thickness of the glass plate 54 is determined by the optical properties and physical dimensions of the polarization beam displacers.

Figure 26:
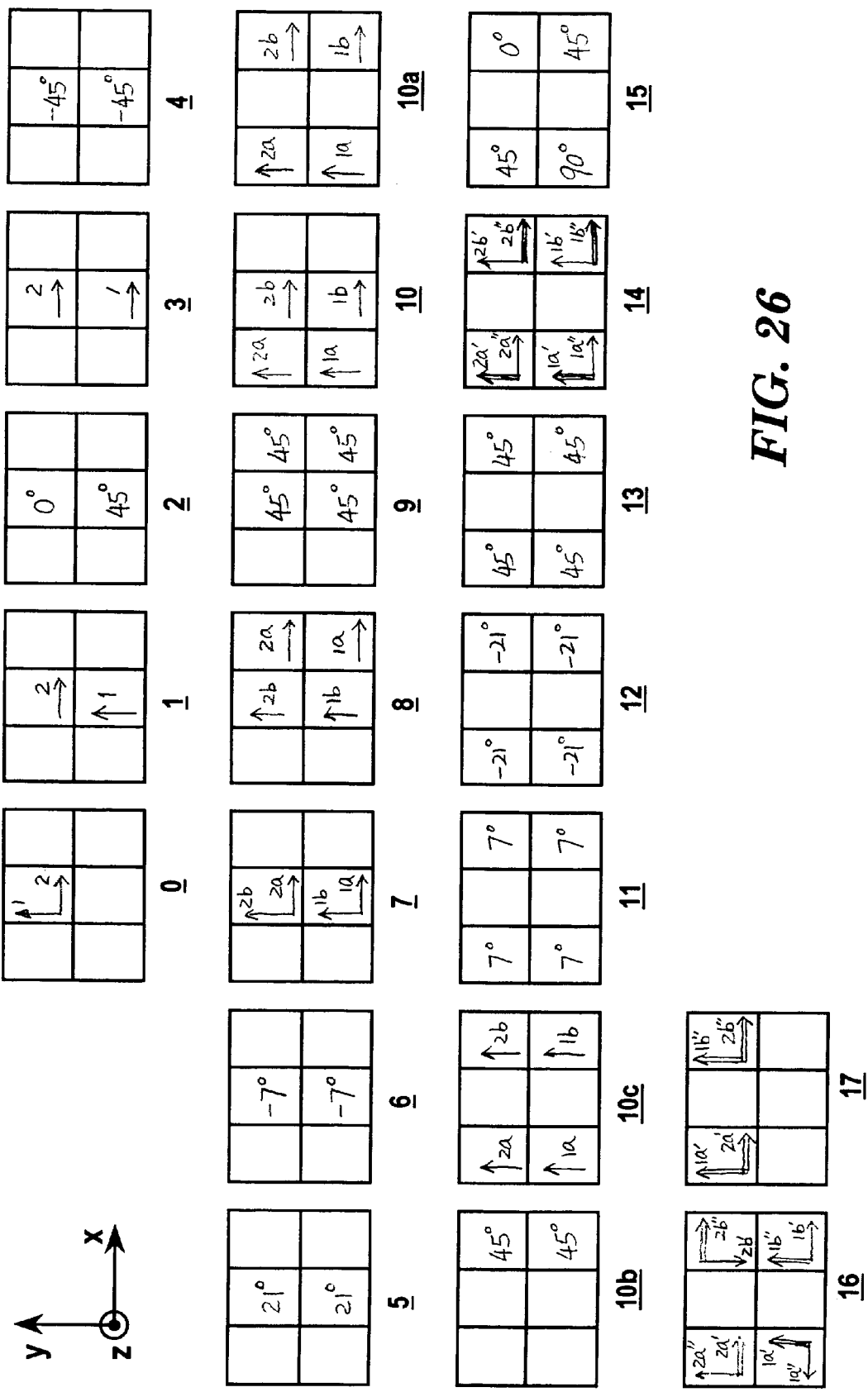
FIG. 26 is a series of frames showing the optical beam states, the crystal orientations and the quarter-wave and half-wave waveplate orientations at different locations in an exemplary fold interleaver of FIG. 25.

Referring now to FIG. 26, the optical beam states, the crystal orientations, and waveplate orientations at different locations for the fold interleaver of FIG. 25 are shown.

Figure 27:
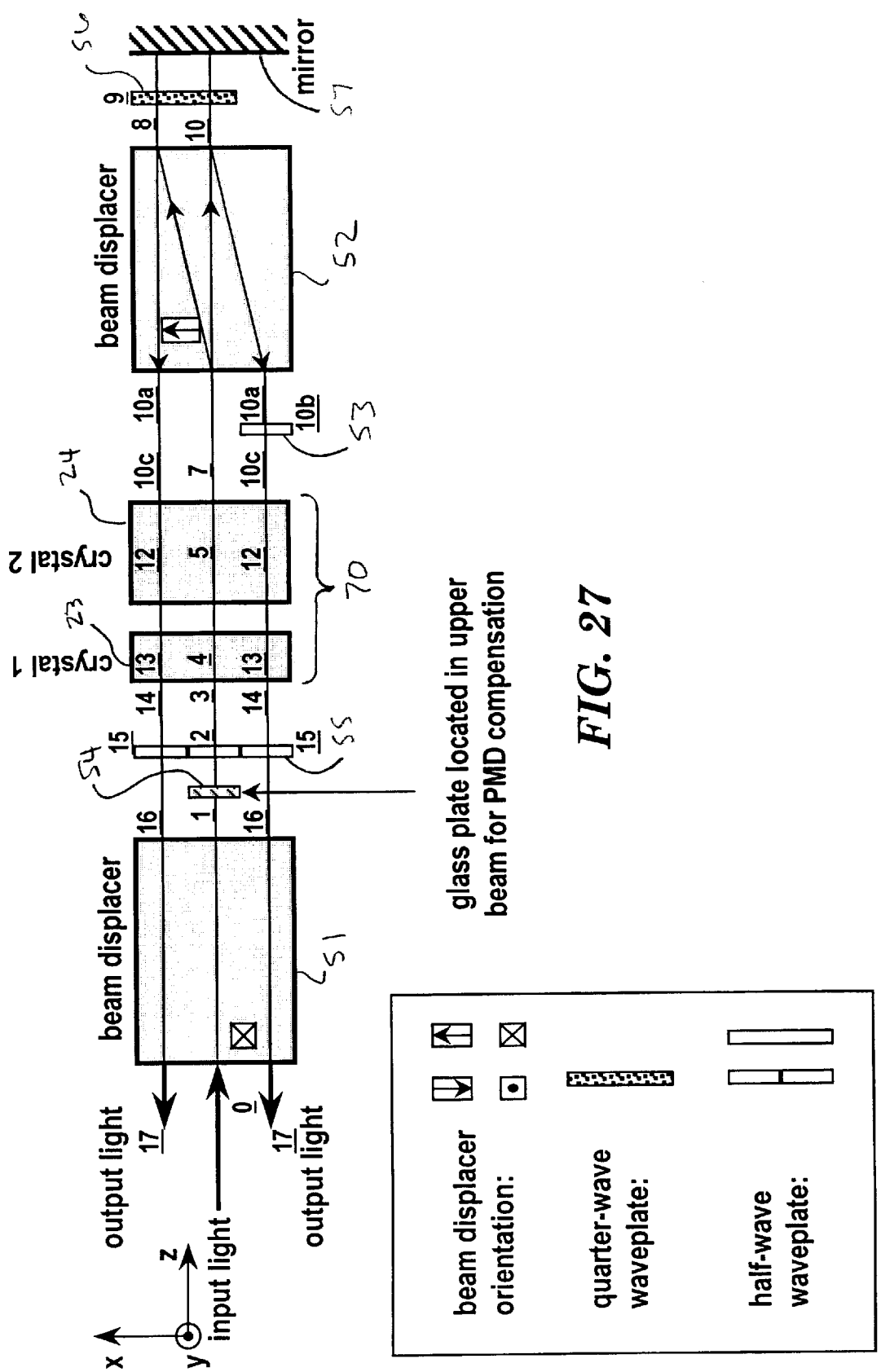
FIG. 27 is a schematic diagram of a two-element fold interleaver according to another embodiment of the present invention, wherein a mirror is used to cause light to be transmitted back through the birefringent elements.
Figure 28:
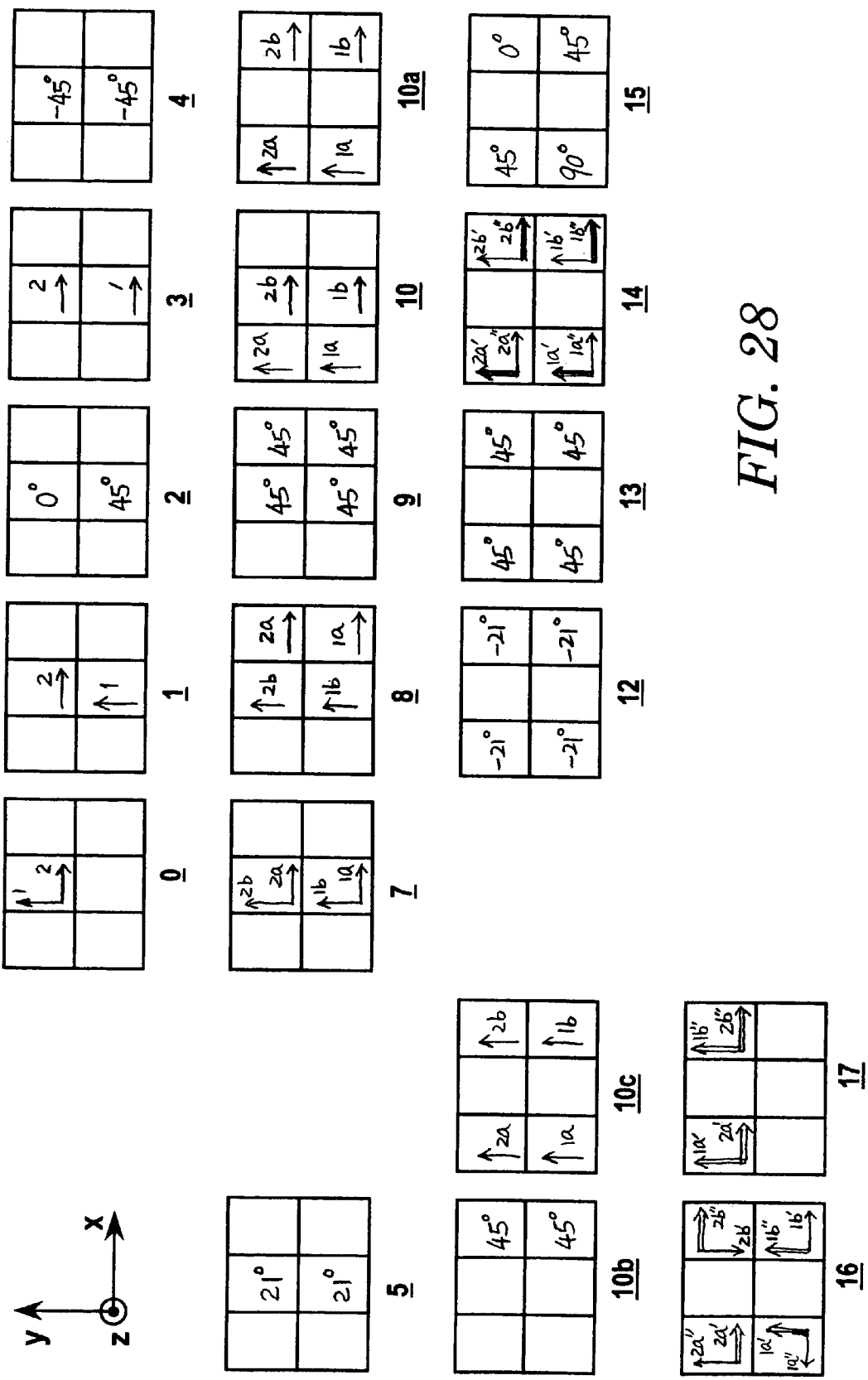
FIG. 28 is a series of frames showing the optical beams states, the crystal orientations and the quarter-wave and half-wave waveplate orientations at different locations in an exemplary fold interleaver of FIG. 27.

Referring now to FIG. 27, a fold interleaver having a mirror rather than a prism may alternatively comprise only two birefringent elements or crystals, if desired. Although the use of two birefringent elements, rather than three, tends to degrade the transmission characteristics of the interleaver, in some instances sufficient performance may be provided. Of course, utilizing two birefringent elements in the birefringent element assembly 70, rather than utilizing three birefringent elements therein, provides a substantial costs savings. In FIG. 28, the optical beam states, the crystal orientations, and waveplate orientations at different locations for the fold interleaver of FIG. 27 are shown.

Although the invention described herein comprises an interleaver having birefringent crystals in the birefringent element assembly thereof, it is also possible to form an interleaver utilizing birefringent effects formed other than with birefringent crystals. For example, it is possible to achieve a birefringent effect utilizing polarization beam splitters and/or polarization beam displacers to separate an incoming optical beam into two orthogonally polarized optical beams and then causing the two orthogonally polarized beams to be transmitted along two paths, wherein each path has a different optical path length. In such instances, the above-mentioned angles associated with the birefringent crystals can be converted into equivalent relative angles between the optical beam polarization direction and the equivalent fast axes of the birefringent elements. Further, the phase delays for the first, second and third birefringent elements will preferably be the same as when birefringent crystals are utilized.

Thus, according to the present invention, a fold birefringent filter or interleaver is provided, wherein reflecting light from a birefringent element assembly thereof back into and through the birefringent element assembly enhances transmission characteristic thereof and/or mitigates dispersion introduced thereby.

Although most examples discussed above utilize equivalent birefringent filter element orientations angles of 45°, −21° and −70 and utilize phase delays of Γ, 2Γ and 2Γ, those skilled in the art will appreciate that various other angles and phase delays are likewise suitable. For example, phase delays of Γ, 2Γ and Γ may alternatively be utilized.

The interleavers described herein are suitable for demultiplexing optical signals. Those skilled in the art will appreciate similar structures may be utilized to multiplex optical signals.

As those skilled in the art will appreciate, the waveplates which are utilized in the present invention can optionally be omitted in some instances by rotating subsequent components appropriately. Further, various devices and/or materials may alternatively be utilized to orient the polarization direction of light beams. For example, devices and/or materials which are responsive to applied voltages, currents, magnetic fields and/or electrical fields may be used to orient the polarization direction of light beams. Thus, the use of waveplates herein is by way of example only, and not by way of limitations.

Further, when waveplates having identical orientations are dispose next to one another, then a common waveplate may be substituted therefor.

According to the presenting invention, a fold interleaver is provided which provides enhanced transmission and/or dispersion characteristics. If dispersion mitigation is not an important design requirement, then the fold interleaver may be configured so as to enhance transmission characteristics, and thereby mitigate crosstalk, without necessarily reducing dispersion. Such configuration of an interleaver of the present invention may be desirable when the cost is an important factor. Enhanced transmission characteristics without necessarily improving dispersion may be provided by omitting the waveplate which aligns the component light beams parallel to one another prior to the component light beams being transmitted back through the birefringent element assembly.

However, if reduced dispersion is desired, then a waveplate or the like is provided so as to align the polarization directions of the two component light beams parallel to one another and both perpendicular with respect to the polarization direction of light initially input to the birefringent element assembly.

It is understood that the exemplary fold interleaver described herein and shown in the drawings represents only a presently preferred embodiment of the invention. Indeed, various modifications and additions may be made to such embodiment without departing from the spirit and scope of the invention. For example, the use of a 50 GHz fold interleaver herein is by way of example only, and not by way of limitation. Those skilled in the art will appreciate that various other channel spacings, particularly more narrow channel spacings, are likewise suitable. Thus, these and other modifications and additions may be obvious to those skilled in the art and may be implemented to adapt the present invention for use in a variety of different applications.

What is claimed is:

1. An interleaver comprising:
   a birefringent element assembly providing two output components, the birefringent element assembly comprising:
   a first birefringent element having an angular orientation of 45° with respect to a polarization direction of light input to the birefringent element assembly and having a phase delay of Γ;
   a second birefringent element having an angular orientation of −21° with respect to a polarization direction of light input to the birefringent element assembly and having a phase delay of 2Γ; and
   a reflector configured to direct the two components from the birefringent element assembly back through the birefringent element assembly.

2. The interleaver as recited in claim 1, further comprising a polarization rotator configured to make the two components approximately parallel with respect to one another prior to the two components being transmitted back through the birefringent element assembly.

3. The interleaver as recited in claim 1, further comprising a polarization rotator configured to make the two components either parallel or orthogonal with respect to a polarization direction of light input to the birefringent element assembly.

4. The interleaver as recited in claim 2, wherein the polarization rotator is configured to make the two components approximately orthogonal with respect to a polarization direction of light input to the birefringent element assembly.

5. The interleaver as recited in claim 3, wherein the polarization rotator comprises a half-wave waveplate.

6. The interleaver as recited in claim 3, wherein the polarization rotator comprises a mirror and a quarter-wave waveplate.

7. The interleaver as recited in claim 1, wherein the reflector comprises a prism.

8. The interleaver as recited claim 1, wherein the reflector comprises a mirror.

9. The interleaver as recited in claim 1, wherein the birefringent element assembly comprises birefringent crystals.

10. The interleaver as recited in claim 1, wherein an order of the first birefringent element and second birefringent element is selected from the group consisting of:

first birefringent element, second birefringent element; and second birefringent element, first birefringent element.

11. The interleaver as recited in claim 1, wherein the birefringent element assembly further comprises a third birefringent element having an angular orientation of 7° with respect to a polarization direction of light input to the birefringent element assembly and having a phase delay of 2Γ.

12. The interleaver as recited in claim 11, wherein an order of the first birefringent element, second birefringent element, and third birefringent element is selected from the group consisting of:

first birefringent element, second birefringent element, third birefringent element; and third birefringent element, second birefringent element, first birefringent element.

13. The interleaver as recited in claim 1, wherein the birefringent element assembly comprises three birefringent elements.

14. A method for interleaving, the method comprising:

transmitting light through a birefringent element assembly, the birefringent element assembly separating the light into first and second generally orthogonal components, the birefringent element assembly comprising:

a first birefringent element having an angular orientation of 45° with respect to a polarization direction of light input to the birefringent element assembly and having a phase delay of Γ;

a second birefringent element having an angular orientation of −21° with respect to a polarization direction of light input to the birefringent element assembly and having a phase delay of 2Γ;

transmitting the first and second components back through the birefringent element assembly.

15. The method as recited in claim 14, wherein an order of the first birefringent element and second birefringent element is selected from the group consisting of:

first birefringent element, second birefringent element; and second birefringent element, first birefringent element.

16. A method for interleaving, the method comprising:

transmitting light through a birefringent element assembly, the birefringent element assembly separating the light into first and second generally orthogonal components, the birefringent element assembly comprising:

a first birefringent element having an angular orientation of 45° with respect to a polarization direction of light input to the birefringent element assembly and having a phase delay of Γ;

a second birefringent element having an angular orientation of −21° with respect to a polarization direction of light input to the birefringent element assembly and having a phase delay of 2Γ;

a third birefringent element having an angular orientation of 7° with respect to a polarization direction of light input to the birefringent element assembly and having a phase delay of 2Γ; and transmitting the first and second components back through the birefringent element assembly.

17. The interleaver as recited in claim 16, wherein an order of the first element, second birefringent element, and third birefringent element is selected from the group consisting of:

first birefringent element, second birefringent element, third birefringent element; and third birefringent element, second birefringent element, first birefringent element.

* * * * *